United States Patent
Tsumekawa et al.

(10) Patent No.: US 9,516,186 B2
(45) Date of Patent: Dec. 6, 2016

(54) IMAGE SENSOR UNIT, PAPER SHEET DISTINGUISHING APPARATUS, IMAGE READING APPARATUS, AND IMAGE FORMING APPARATUS

(71) Applicant: CANON COMPONENTS, INC., Kodama-gun, Saitama (JP)

(72) Inventors: Yoshihiko Tsumekawa, Saitama (JP); Ryoki Matsui, Saitama (JP)

(73) Assignee: CANON COMPONENTS, INC., Saitama (JP)

( * ) Notice: Subject to any disclaimer, the term of this patent is extended or adjusted under 35 U.S.C. 154(b) by 0 days.

(21) Appl. No.: 14/755,042

(22) Filed: Jun. 30, 2015

(65) Prior Publication Data
US 2016/0006898 A1 Jan. 7, 2016

(30) Foreign Application Priority Data
Jul. 2, 2014 (JP) .................................. 2014-137081

(51) Int. Cl.
*H04N 1/04* (2006.01)
*H04N 1/028* (2006.01)
(Continued)

(52) U.S. Cl.
CPC ...... *H04N 1/02835* (2013.01); *H04N 1/00557* (2013.01); *H04N 1/0289* (2013.01); *H04N 1/02895* (2013.01); *G02B 6/001* (2013.01)

(58) Field of Classification Search
CPC .............. H04N 1/0289; H04N 1/02895; H04N 1/00557; H04N 1/02835
(Continued)

(56) References Cited

U.S. PATENT DOCUMENTS 5,945,664 A    8/1999   Ogura
9,158,062 B2 * 10/2015  Yoshida ............... G02B 6/0096
(Continued)

FOREIGN PATENT DOCUMENTS

JP    H10285342 A    10/1998
JP    2006243258 A    9/2006
(Continued)

OTHER PUBLICATIONS

Office Action issued in Japanese Application No. JP2014-137081, mailed Aug. 16, 2016.

*Primary Examiner* — Houshang Safaipour
(74) *Attorney, Agent, or Firm* — Rossi, Kimms & McDowell LLP

(57) ABSTRACT

An image sensor unit includes: a light source; a rod-shaped light guide; a light condenser that condenses light from an illuminated object; and a frame. The frame includes: a light guide housing chamber that houses the light guide; a light condenser housing chamber that houses the light condenser; and a partition wall provided between the light guide housing chamber and the light condenser housing chamber. The light guide includes: a light incident surface that receives light emitted by the light source; a light diffusing surface that diffuses the light entered from the light incident surface; and an abutment surface abutted to one side of the partition wall, which covers at least a part of the abutment surface of the light guide, where an incident angle to the abutment surface of the light directly reaching the abutment surface from the light diffusing surface is smaller than a critical angle.

9 Claims, 15 Drawing Sheets

(51) Int. Cl.
   *H04N 1/00* (2006.01)
   *F21V 8/00* (2006.01)

(58) Field of Classification Search
   USPC ................................. 358/484.498, 497, 474
   See application file for complete search history.

(56) References Cited

U.S. PATENT DOCUMENTS

| | | | |
|---|---|---|---|
| 2006/0197822 A1 | 9/2006 | Sakurai | |
| 2012/0194878 A1 | 8/2012 | Nakamura | |
| 2014/0333974 A1* | 11/2014 | Sugiyama | ............... H04N 1/031 358/474 |

FOREIGN PATENT DOCUMENTS

| | | | |
|---|---|---|---|
| JP | 2012074984 A | 4/2012 |
| JP | 2012156827 A | 8/2012 |

* cited by examiner

IMAGE SENSOR UNIT, PAPER SHEET DISTINGUISHING APPARATUS, IMAGE READING APPARATUS, AND IMAGE FORMING APPARATUS

CROSS-REFERENCE TO RELATED APPLICATIONS

This application is based upon and claims the benefit of priority of the prior Japanese Patent Application No. 2014-137081, filed on Jul. 2, 2014, the entire contents of which are incorporated herein by reference.

BACKGROUND OF THE INVENTION

Field of the Invention

The present invention relates to an image sensor unit, a paper sheet distinguishing apparatus, an image reading apparatus, and an image forming apparatus.

Description of the Related Art

There is an image sensor unit including a light source, a rod-shaped light guide, and a rod-shaped light condenser (for example, rod-lens array), wherein the light guide converts light emitted by the light source into a line light source (shapes the light into a line) to illuminate an illuminated object, and the light condenser condenses the reflected light. Patent Document 1 discloses such an image sensor unit, wherein the light guide and the light condenser are arranged in parallel, and a partition wall provided on a frame is placed between the light guide and the light condenser. Patent Document 1 further discloses a configuration, wherein notches are formed at a plurality of parts of the partition wall, and the notches are filled with (piled up with) an adhesive for bonding the light condenser to the image sensor unit.

It is preferable that the light emitted to the illuminated object is uniform throughout the whole length. However, leak light may be generated from the light guide, and the amount of light emitted to the illuminated object may be nonuniform when the leak light reaches the illuminated object. For example, when the notches for filling the adhesive are formed on the partition wall, the leak light from the light guide may pass through the notches and reach the illuminated object. Consequently, the amount of light emitted to the illuminated object becomes locally larger at the parts provided with the notches than at other parts. As a result, the uniformity of the output may be reduced. In the image sensor unit, it is preferable that the output is similar (tendency of output is the same) even when the illuminated object is displaced in a light axis direction of the light condenser (even when the position in the light axis direction is different). However, the similarity of output may be broken down according to the configuration described above. Such a problem easily occurs when the size and the width of the frame of the image sensor unit are reduced, and the distance between the light guide and the light condenser is close.

Patent Document 1

Japanese Laid-open Patent Publication No. 2012-074984

SUMMARY OF THE INVENTION

In view of the circumstances, an object of the present invention is to suppress leak light from a light guide, to make the output uniform, and to improve the similarity of the output.

The present invention provides an image sensor unit including: a light source; a rod-shaped light guide that shapes light emitted by the light source into a line to illuminate an illuminated object; a light condenser that condenses the light from the illuminated object; and a frame that houses the light guide and the light condenser, the frame including: a light guide housing chamber that houses the light guide; a light condenser housing chamber that houses the light condenser; a partition wall provided between the light guide housing chamber and the light condenser housing chamber, the light guide including: a light incident surface that receives the light emitted by the light source; a light diffusing surface that diffuses the light entered from the light incident surface; a light emission surface that emits the light toward the illuminated object; and an abutment surface abutted to one side of the partition wall, wherein a part of the abutment surface of the light guide, where an incident angle to the abutment surface of the light directly reaching the abutment surface from the light diffusing surface is smaller than a critical angle, is covered by the partition wall, and the light condenser and the partition wall are bonded by an adhesive.

The present invention provides a paper sheet distinguishing apparatus that reads light from a paper sheet while relatively moving an image sensor unit and the paper sheet, wherein the image sensor unit is the image sensor unit of the present invention.

The present invention provides an image reading apparatus that reads reflected light from an illuminated object while relatively moving an image sensor unit and the illuminated object, wherein the image sensor unit is the image sensor unit of the present invention.

The present invention provides an image forming apparatus including: image reading means for reading reflected light from an illuminated object while relatively moving an image sensor unit and the illuminated object; and image forming means for forming an image in a recording medium, wherein the image sensor unit is the image sensor unit of the present invention.

BRIEF DESCRIPTION OF THE DRAWINGS

FIG. 11 is a perspective view illustrating a configuration of a flat-bed type scanner 7a;

DETAILED DESCRIPTION OF THE PREFERRED EMBODIMENTS

Figure 1:
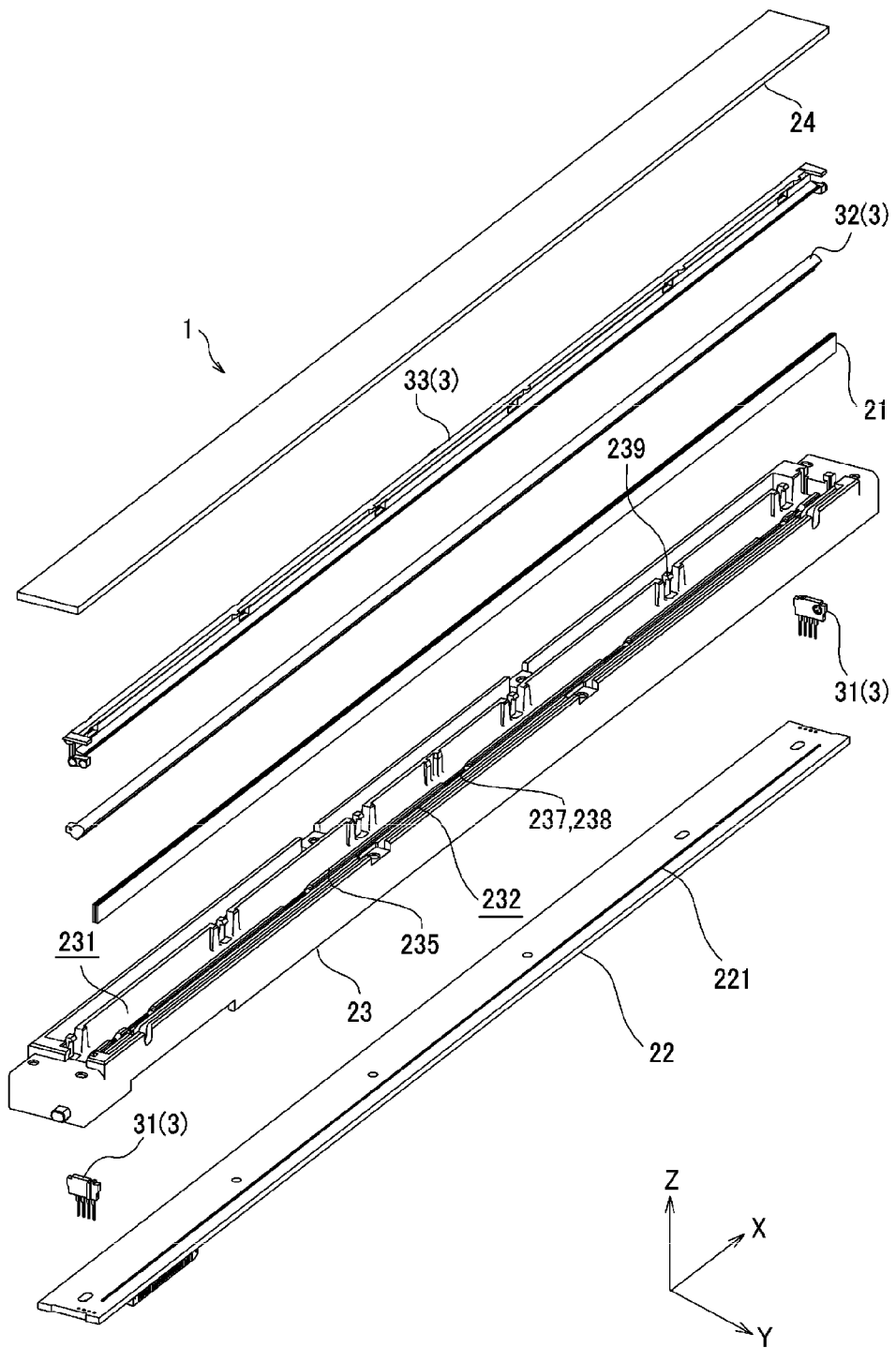
FIG. 1 is an exploded perspective view schematically illustrating a configuration example of an image sensor unit 1.

Hereinafter, embodiments of the present invention will be described in detail with reference to the drawings. The embodiments of the present invention illustrate an image sensor unit as well as an image reading apparatus and an image forming apparatus to which the image sensor unit is applied. In the drawings, three-dimensional directions are indicated by arrows of X, Y, and Z. The X direction is a main-scan direction of the image sensor unit. The Y direction is a sub-scan direction of the image sensor unit. The Z direction is a vertical direction of the image sensor unit. In the embodiments of the present invention, the side closer to an illuminated object P is the upper side. The image sensor unit according to the embodiments of the present invention emits light to the illuminated object P while moving in the sub-scan direction relative to the illuminated object P and reads an image of the illuminated object P based on light from the illuminated object P.

(Image Sensor Unit)

Figure 2:
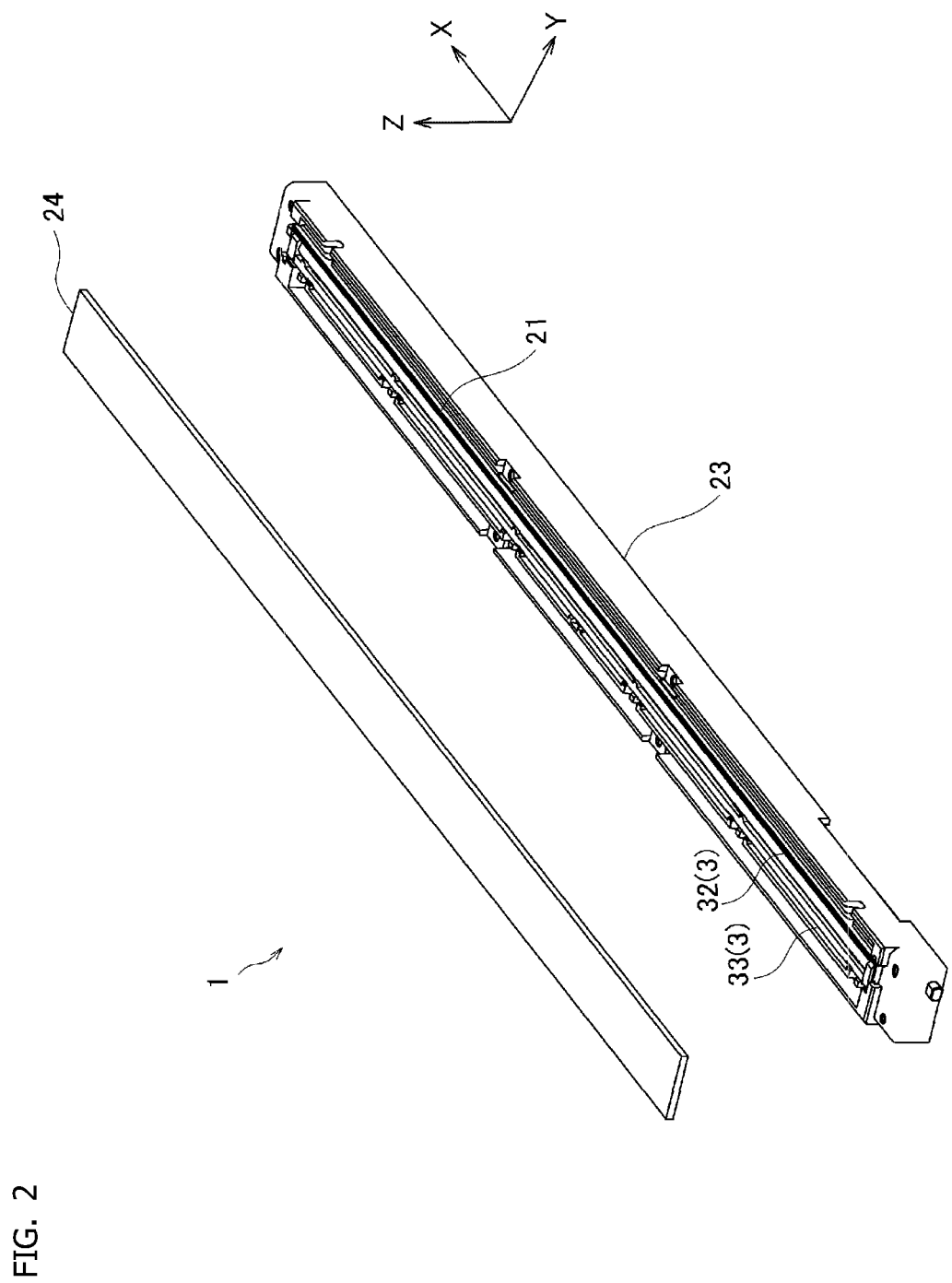
FIG. 2 is an external perspective view schematically illustrating a configuration example of an assembled state of the image sensor unit 1.

First, a configuration of an image sensor unit 1 will be described. FIG. 1 is an exploded perspective view schematically illustrating a configuration example of the image sensor unit 1. FIG. 2 is an external perspective view schematically illustrating a configuration example of the image sensor unit 1. As shown in FIGS. 1 and 2, the image sensor unit 1 includes an illumination apparatus 3, a light condenser 21, a circuit board 22, a frame 23, and a frame cover 24. The illumination apparatus 3 includes a light source 31, a light guide 32, and a light guide cover 33.

The light source 31 of the illumination apparatus 3 includes, for example, light emitting elements with emission wavelengths of red (R), green (G), and blue (B) colors. The light emitting elements with the emission wavelengths of the colors can be various well-known LEDs. The configuration of the light source 31 is appropriately set according to specifications and the like of the image sensor unit 1, and the configuration is not particularly limited. The configuration (for example, band of emission wavelength) and the number of light emitting elements included in the light source 31 are not particularly limited. For example, the light source 31 may include elements that emit infrared light and ultraviolet light, in addition to light emitting elements of red, green, and blue colors described above.

Figure 3A:
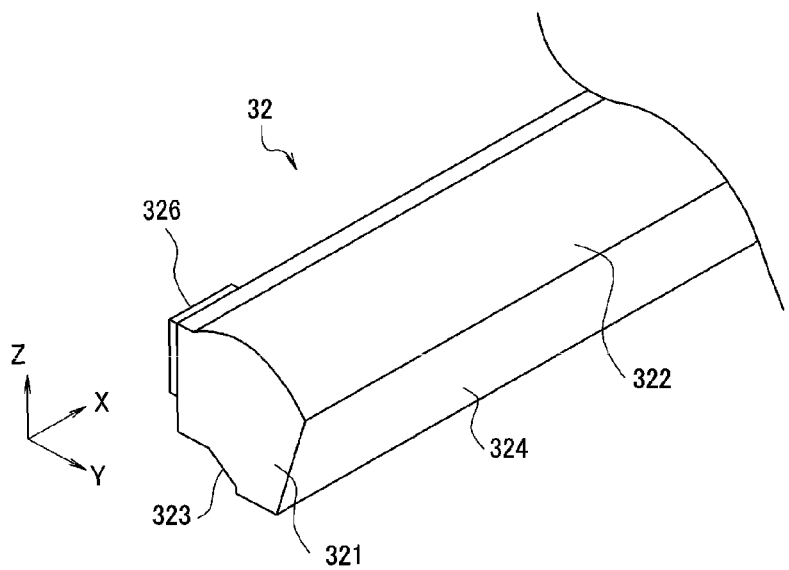
FIG. 3A is an external perspective view schematically illustrating a configuration of a light guide 32 and is an enlarged view illustrating the vicinity of an end in a longitudinal direction (main-scan direction)
Figure 3B:
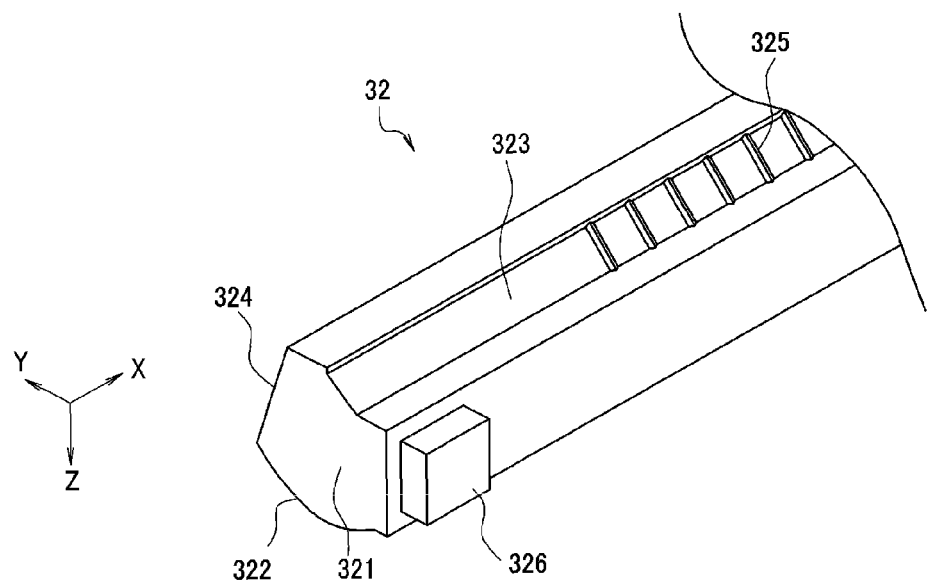
FIG. 3B is an external perspective view schematically illustrating the configuration of the light guide 32 and is an enlarged view illustrating the vicinity of the end in the longitudinal direction (main-scan direction)

The light guide 32 of the illumination apparatus is an optical member that converts the light emitted by the light source 31 into a line light source (shapes the light into a line). Here, a configuration of the light guide 32 will be described with reference to FIGS. 3A and 3B. FIGS. 3A and 3B are external perspective views schematically illustrating the configuration of the light guide 32 and are enlarged views illustrating the vicinity of an end in a longitudinal direction (main-scan direction). FIG. 3A is a view from the upper side, and FIG. 3B is a view from the lower side. The light guide 32 has a rod-shaped configuration that is long in the main-scan direction and is integrally formed from a transparent resin material, such as an acrylic resin. A light incident surface 321 for receiving the light emitted by the light source 31 is provided on an end surface in the longitudinal direction (main-scan direction) of the light guide 32. A light emission surface 322 for emitting the received light to the outside (illuminated object P) and a light diffusing surface 323 for diffusing the received light are provided on side surfaces of the light guide 32. An abutment surface 324 for positioning on the frame 23 is further provided on a side surface of the light guide 32. The abutment surface 324 also has a function of a light reflection surface for reflecting the received light.

The light incident surface 321 may be provided on both end surfaces of the light guide 32 in the longitudinal direction or may be provided on one of the end surfaces. When the light incident surface 321 is provided on both end surfaces, the illumination apparatus 3 includes two light sources 31, and the two light sources 31 emit light toward the light incident surfaces 321 on both end surfaces, respectively. When the light incident surface 321 is provided only on one of the end surfaces, the illumination apparatus 3 includes one light source 31, and the one light source 31 emits light toward the light incident surface 321 provided on one of the end surfaces of the light guide 32.

The light emission surface 322 is provided on a side surface of the light guide 32. The light emission surface 322 has a shape (for example, band shape) elongated in the main-scan direction. The length (dimension in the main-scan direction) of the light emission surface 322 is set according to the width (dimension in the main-scan direction) of the illuminated object P handled by the image sensor unit 1. For example, to read the illuminated object P in A3 size, the length of the light emission surface 322 is set to a dimension according to the width of the illuminated object P in A3 size. The light emission surface 322 is formed in, for example, a curved surface that is convex toward a reading line O (see FIG. 5) of the illuminated object P to allow illuminating the reading line O of the illuminated object P.

The light diffusing surface 323 is also provided on a side surface of the light guide 32 and has a shape (for example, band shape) elongated in the main-scan direction. A plurality of diffusion patterns 325 are provided on the light diffusing surface 323. In the present embodiment, the diffusion patterns 325 are prism structures for emitting the light entered from the light incident surface 321 to the outside (particularly, a light reflection surface 331 of the light guide cover 33 described later). The prism structures have, for example, a rib-shaped configuration protruding from the surface of the light diffusing surface 323 and extending in a direction perpendicular to the longitudinal direction. The cross section of the prism structures is substantially a triangle, and an inclination angle of the surface (angle relative to the surface of the light diffusing surface 323) is set to an angle that does not totally reflect the light entering from the light incident surface 321 and reaching the prism structures. The angle is appropriately set according to the wavelength band of the light emitted by the light source 31, the relative positional relationship between the light incident surface 321 and the prism structures, and the like. According to the configuration, at least part of the light entering from the light incident surface 321 and reaching the prism structures is emitted to the outside from the surfaces of the prism structures. The light emitted from the outside of the diffusion patterns 325 is reflected by the light reflection surface 331 of the light guide cover 33 and enters inside of the light guide 32 again from the light diffusing surface 323. The number and the intervals of the prism structures as the diffusion patterns 325 are not particularly limited. The dimensions and the intervals of the prism structures as the diffusion patterns 325 may not be uniform. Furthermore, the diffusion patterns 325 are not limited to the prism structures. For example, the diffusion patterns 325 may be dot patterns or the like printed by a paint that reflects light.

When the light guide 32 is inserted to the light guide cover 33 and attached to the frame 23 in this state, the abutment surface 324 is abutted to one side in the sub-scan direction of a partition wall 235 of the frame 23 described later. When the abutment surface 324 is abutted to one side in the sub-scan direction of the partition wall 235 of the frame 23, the light guide 32 is positioned with respect to the frame 23. The abutment surface 324 and the light diffusing surface 323 are in a predetermined relationship (described later).

As shown in FIGS. 3A and 3B, a positioning portion 326 for positioning relative to the light guide cover 33 is provided near the end of the light guide 32 in the longitudinal direction. The positioning portion 326 provided on the light guide is, for example, a projection protruding in the sub-scan direction.

Figure 4:
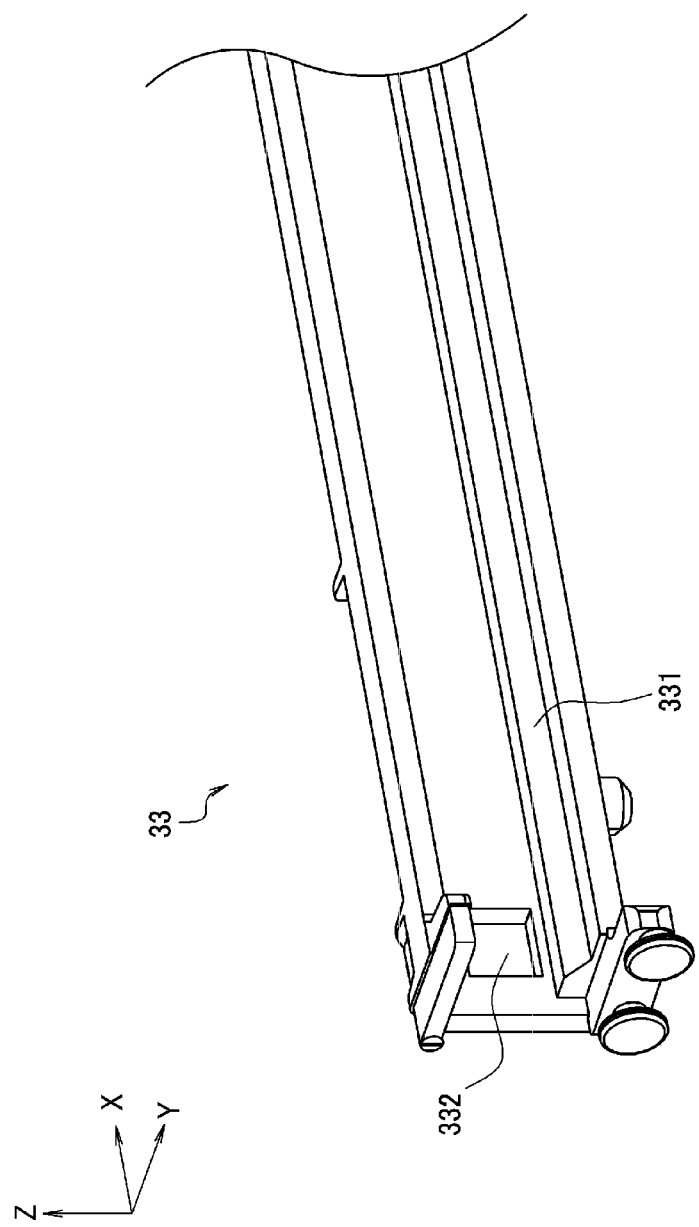
FIG. 4 is an external perspective view schematically illustrating a configuration example of a light guide cover 33 and is an enlarged view illustrating the vicinity of an end in the longitudinal direction (main-scan direction)

The light guide cover 33 is a member attached to the light guide 32 to cover part of the outer periphery. Here, a configuration example of the light guide cover 33 will be described with reference to FIG. 4. FIG. 4 is an external perspective view schematically illustrating a configuration example of the light guide cover 33 and is an enlarged view illustrating the vicinity of the end in the longitudinal direction (main-scan direction). The light guide cover 33 has a function of diffusing the light entering the light guide 32 and a function of improving the utilization efficiency of light. When the illumination apparatus 3 is applied to the image sensor unit 1, the light guide cover 33 also has a function of positioning the light guide 32 on the frame 23 of the image sensor unit 1.

The light guide cover 33 is rod-shaped. The light guide cover 33 is integrally formed by a material with a high reflectance of light, such as white polycarbonate mixed with titanium oxide powder. The cross section of the light guide cover 33 taken along a plane perpendicular to the longitudinal direction (main-scan direction) is substantially U-shaped. Therefore, the light guide 32 can be inserted to the inner side of the light guide cover from a predetermined direction (opening side) perpendicular to the main-scan direction. The light reflection surface 331 is provided on the inner side of the light guide cover 33. The light reflection surface 331 is a surface that reflects the light emitted from the diffusion patterns 325 of the light guide 32 and has a shape (for example, band shape) elongated in the main-scan direction. The light reflection surface 331 has a surface property of producing diffuse reflection of light. When the light guide 32 is inserted to the inner side of the light guide cover 33, the light reflection surface 331 of the light guide cover 33 covers the light diffusing surface 323 of the light guide 32. Therefore, the light emitted from the outside of the diffusion patterns 325 of the light guide 32 is reflected by the light reflection surface 331 (diffuse reflection of light is produced) and enters inside of the light guide from the light diffusing surface 323. On the other hand, the light emission surface 322 and the abutment surface 324 of the light guide 32 are exposed without being covered by the light guide cover 33. In this way, when the light guide 32 is inserted to the light guide cover 33, the light guide cover 33 covers part of the outer periphery of the light guide 32.

A positioning portion 332 is provided near the end of the light guide cover 33 in the longitudinal direction. The positioning portion 332 provided on the light guide cover 33 is, for example, a concave portion or a through-hole that allows engagement of the positioning portion 326 of the light guide cover 33. When the positioning portion 326 provided on the light guide 32 is engaged with (fitted with) the positioning portion 332 provided on the light guide cover 33, the light guide 32 and the light guide cover 33 are positioned relative to each other.

Other members will be described with reference again to FIG. 1. The light condenser 21 is an optical member that focuses the light from the illuminated object P on the surface of an image sensor 221 (described later). The light condenser 21 is, for example, a rod-lens array including a plurality of imaging elements (rod lenses) of an erect equal magnification imaging type linearly arranged in the main-scan direction. It is only necessary that the light condenser 21 includes linearly arranged imaging elements. For example, the light condenser 21 may include imaging elements arranged in a plurality of lines. The light condenser 21 can be an optical member with various conventionally well-known light condensing functions, such as various micro-lens arrays.

The circuit board 22 has a rectangular shape that is long in the main-scan direction. The light source 31 and the image sensor 221 are mounted on the upper surface of the circuit board 22. When the light incident surfaces 321 are provided on both end surfaces of the light guide 32, two light sources 31 are mounted near the both end surfaces of the light guide 32 to allow emitting light to the light incident surfaces 321 on the both end surfaces of the light guide 32, respectively. When the light incident surface 321 is provided on one of the end surfaces of the light guide 32, one light source 31 is mounted near one of the end surfaces of the light guide 32 to allow emitting light to the light incident surface 321 of one of the end surfaces of the light guide 32. In addition, connectors and the like for wiring to the outside are mounted on the circuit board 22.

The image sensor 221 converts the light focused by the light condenser 21 into an electric signal. The image sensor 221 is mounted with the light receiving surface facing upward so as to be able to receive light from the light condenser 21. The image sensor 221 is, for example, an image sensor IC array. The image sensor IC array includes a plurality of image sensor ICs linearly mounted on the surface of the circuit board 22 in the main-scan direction. The image sensor ICs are a plurality of light receiving elements (may also be called photoelectric conversion elements) corresponding to the resolution of reading by the image sensor unit 1. In this way, the image sensor 221 includes a plurality of image sensor ICs (light receiving elements) linearly arranged in the main-scan direction. It is only necessary that the image sensor 221 includes a plurality of linearly arranged image sensor ICs, and other configurations are not particularly limited. For example, the image sensor ICs may be arranged in a plurality of lines to form a staggered arrangement. The image sensor 221 and the image sensor ICs included in the image sensor IC array can be various conventionally well-known image sensors and image sensor ICs.

The frame 23 is a housing of the image sensor unit 1. The frame 23 has a rectangular solid shape that is long in the main-scan direction. The frame is integrally formed by, for example, a light-blocking resin material. The resin material can be, for example, polycarbonate colored in black. The light guide 32 provided with the light guide cover 33, the light condenser 21, and the circuit board 22 provided with the image sensor 221 and the light source 31 are housed and attached to the frame 23.

Figure 5:
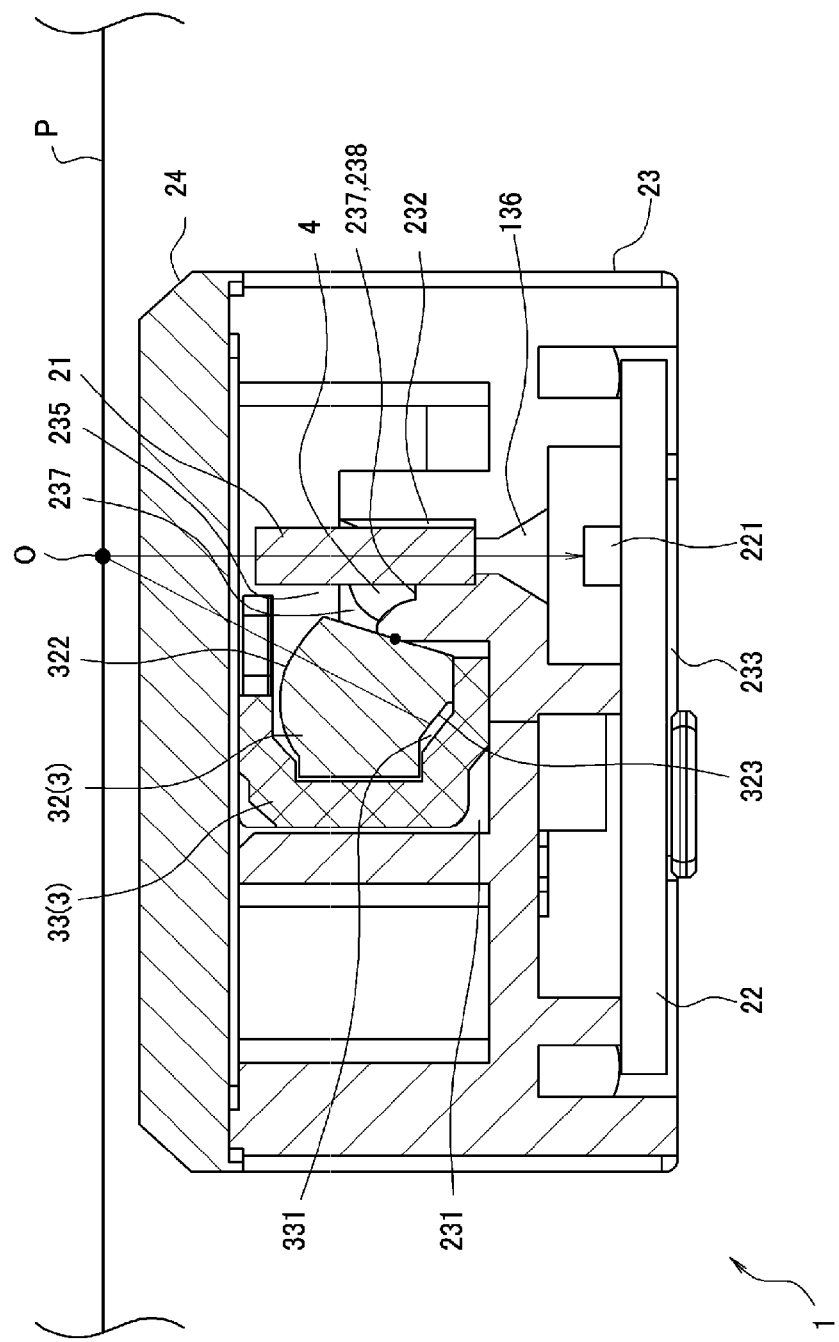
FIG. 5 is a view schematically illustrating a configuration of the image sensor unit 1 and is a sectional view taken along a plane perpendicular to the main-scan direction.

The frame 23 is provided with a light guide housing chamber 231, a light condenser housing chamber 232, and a circuit board housing chamber 233 (see FIG. 5). The light guide housing chamber 231 is an area in which the upper side is open, and the light guide 32 provided with the light guide cover 33 can be housed. The light condenser housing chamber 232 is an area in which the upper side is open, and the light condenser 21 can be housed. The circuit board housing chamber 233 is an area in which the lower side is open, and the circuit board 22 mounted with the light source 31 and the image sensor 221 can be housed (see FIG. 5). A partition wall 235 is provided between the light guide housing chamber 231 and the light condenser housing chamber 232. The frame 23 is provided with an opening 136 for linking the light condenser housing chamber 232 and the circuit board housing chamber 233, allowing the light to pass through (see FIG. 5).

The light guide housing chamber 231 and the light condenser housing chamber 232 are areas elongated in the main-scan direction and are formed substantially parallel to each other. The light guide housing chamber 231 and the light condenser housing chamber 232 are divided by the partition wall 235. The partition wall 235 has a rib-shaped (in other words, band-shaped) configuration protruding upward and extending in the main-scan direction. Adhesive filling portions 237 for filling (piling) an adhesive for bonding the light condenser 21 to the frame 23 are provided at a plurality of parts of the partition wall 235. The adhesive filling portion 237 has a notch-shaped configuration in which the upper side is open. Therefore, a bottom surface 238 of the notch-shaped adhesive filling portion 237 (see FIGS. 7A and 7B) is lower than the top surface of the partition wall 235. In this way, the notch-shaped parts with locally low height are provided at a plurality of parts of the partition wall 235. Details of the configuration of the adhesive filling portions 237 will be described later.

In addition, the frame 23 is provided with a holding claw 239 that positions and fixes the light guide cover 33 housed in the light guide housing chamber 231. The holding claw 239 is an elastically deformable structure and is integrated with the frame 23. The holding claw 239 urges the light guide 32 housed in the light guide housing chamber 231 toward the partition wall 235.

The frame cover 24 is a plate-shaped member attached to the upper side of the frame 23. The frame cover 24 is formed from, for example, a transparent resin material such as an acrylic resin. The frame cover 24 has a function of protecting the members housed in the frame 23, a function of preventing foreign matters such as dust from entering inside of the frame 23, a function of keeping the illuminated object P flat, and the like. The image sensor unit 1 may not include the frame cover 24 when the image sensor unit 1 is incorporated into an apparatus, such as a flat-bed scanner, including another member equivalent to the frame cover 24.

(Assembly of Image Sensor Unit)

FIG. 5 is a view schematically illustrating the configuration of the image sensor unit 1 and is a sectional view taken along a plane perpendicular to the main-scan direction. As shown in FIG. 5, the light guide cover 33 is attached to the light guide (the light guide 32 is inserted to the light guide cover 33), and in this state, the light guide 32 and the light guide cover 33 are housed in the light guide housing chamber 231 of the frame 23. When the light guide cover 33 is attached to the light guide 32, the light diffusing surface 323 of the light guide 32 faces the light reflection surface 331 of the light guide cover 33. When the light guide 32 and the light guide cover 33 are housed in the light guide housing chamber 231, the holding claw 239 (see FIG. 1) provided on the frame 23 is abutted to the light guide cover 33 to urge the light guide 32 toward the partition wall 235. The abutment surface 324 of the light guide 32 is then abutted while being urged toward one side in the sub-scan direction (one of the side surfaces in the sub-scan direction) of the partition wall 235. In this way, the abutment surface 324 of the light guide 32 is abutted to one side of the partition wall 235 of the frame 23 to position the light guide 32 with respect to the frame 23. When the light guide 32 is housed in the light guide housing chamber 231 of the frame 23, the bottom of the abutment surface 324 is covered by the partition wall 235. The part where the abutment surface 324 is covered by the partition wall 235 will be described later.

The light condenser 21 is housed in the light condenser housing chamber 232 and is bonded to the frame 23 by an adhesive 4. The adhesive 4 can be various well-known ultraviolet curable adhesives. The light condenser 21 is first housed in the light condenser housing chamber 232, and the ultraviolet curable adhesive 4 is poured from above into the notch-shaped adhesive filling portion 237 provided on the partition wall 235. The notch-shaped configuration of the adhesive filling portion 237 can prevent the adhesive 4 poured into the adhesive filling portion 237 from flowing out to other parts. Ultraviolet light is then emitted to cure the poured ultraviolet curable adhesive 4. As a result, the light condenser 21 is bonded and fixed to the frame 23. A plurality of adhesive filling portions 237 are provided on the partition wall 235, and the light condenser 21 is bonded to the frame 23 by the adhesive 4 at a plurality of parts.

As described, the light guide 32 and the light condenser 21 are arranged parallel in the frame 23. The partition wall 235 is positioned between the light guide 32 and the light condenser 21. The light guide 32 is housed in the light guide housing chamber 231, and the frame cover 24 is attached to the upper side of the frame 23 while the light condenser 21 is housed in the light condenser housing chamber 232.

The light source 31 is mounted on the circuit board 22, and the image sensor 221 is built. The circuit board 22 is housed in the circuit board housing chamber 233 of the frame 23. When the circuit board 22 is housed in the circuit board housing chamber 233, the light source 31 is arranged at a position that allows emitting light toward the light incident surface 321 of the light guide 32 housed in the light guide housing chamber 231. The image sensor 221 built on the upper surface of the circuit board 22 is positioned on the light axis of the light condenser 21.

In addition, the image sensor unit 1 is provided with attachment portions for attachment to an image reading apparatus (described later) or an image forming apparatus 9 (described later) and a connector for electrical connection to the image reading apparatus or the image forming apparatus 9. The configurations of the attachment portions and the connector are not particularly limited. It is only necessary that the attachment portions allow attachment of the image sensor unit 1 to the image reading apparatus or the image forming apparatus 9. It is only necessary that the connector can connect the image sensor unit 1 with a predetermined device of the image reading apparatus or the image forming apparatus 9, allowing transmission and reception of power and electric signals.

(Operation of Image Sensor Unit)

The image sensor unit 1 sequentially turns on the light emitting elements of each color of the light source 31 to read the illuminated object P. The light emitted by the light source 31 enters inside from the light incident surface 321 of the light guide 32 and is emitted toward the reading line O of the illuminated object P from the light emission surface 322. The light emission surface 322 has a shape elongated in the main-scan direction, and the light guide 32 can convert the light emitted by the light source 31 into a line light source (shape the light into a line). Part of the light entering the light guide 32 is emitted to the outside through the diffusion patterns 325 provided on the light diffusing surface 323, is reflected by the light reflection surface 331 of the light guide cover 33 facing the light diffusing surface 323, and enters inside of the light guide 32 again from the light diffusing surface 323. The light reflection surface 331 of the light guide cover 33 has a surface property of producing diffuse reflection of light, and the light emitted through the diffusion patterns 325 is diffused by being reflected by the light reflection surface 331 and enters inside of the light guide 32. Therefore, the illuminance distribution in the main-scan direction of the light emitted from the light emission surface 322 can be uniform.

The light condenser 21 focuses the reflected light from the reading line O of the illuminated object P on the surface of the image sensor 221. The image sensor 221 converts an optical image formed by the light condenser 21 into an electric signal. The image sensor unit 1 performs the operation while moving in the sub-scan direction relative to the illuminated object P. As a result, the image sensor unit 1 can read the illuminated object P.

(Leak Light from Abutment Surface)

Figure 6:
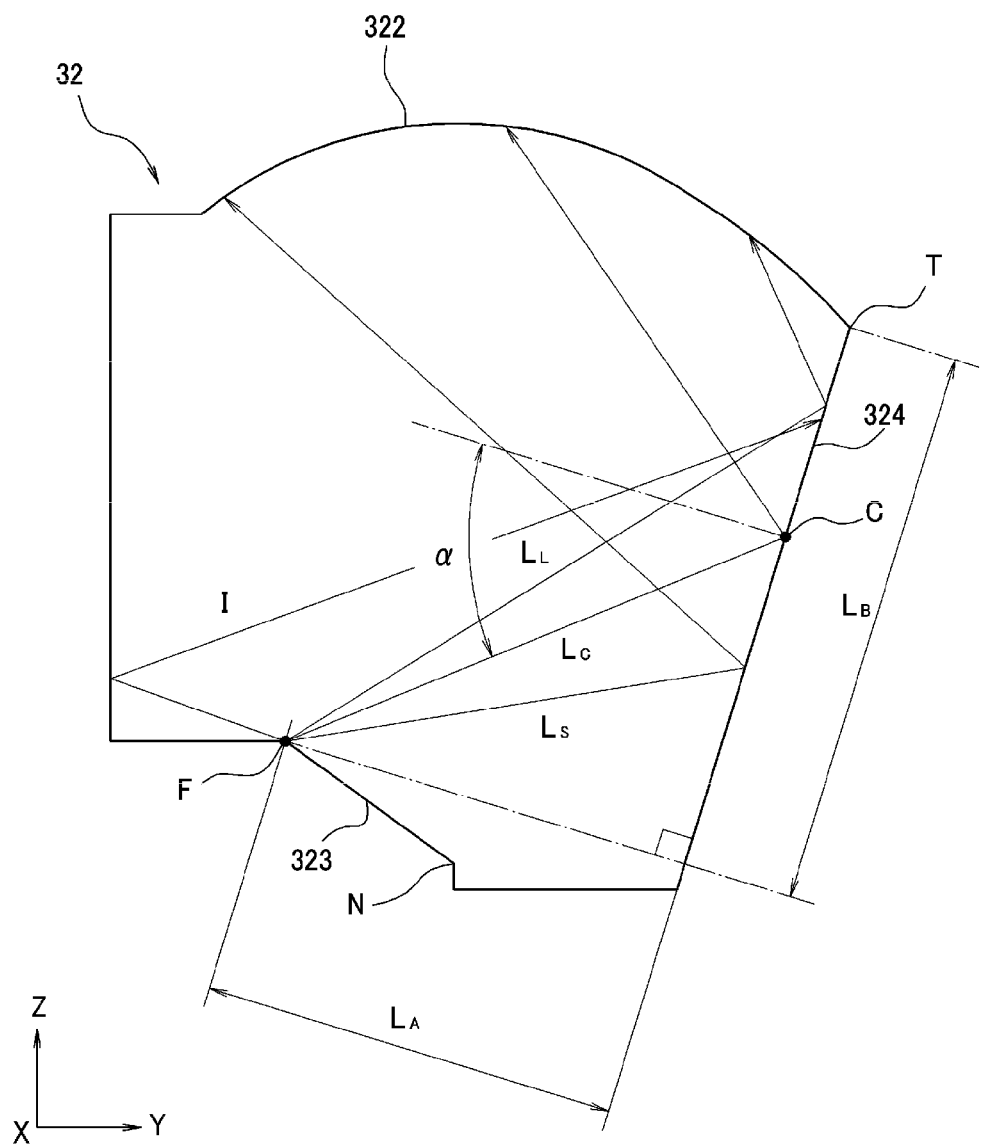
FIG. 6 is a sectional schematic view of the light guide 32 taken along a plane perpendicular to the longitudinal line and is a view schematically illustrating light propagated through the light guide 32.

Leak light from the abutment surface 324 will be described. FIG. 6 is a sectional schematic view of the light guide 32 taken along a plane perpendicular to the longitudinal line and is a view schematically illustrating the light propagated inside of the light guide 32. Part of the light entering the light guide from the light incident surface 321 is emitted toward the light reflection surface 331 of the light guide cover 33 through the diffusion patterns 325, is reflected by the light reflection surface 331, and enters again from the light diffusing surface 323. Part of the light entering from the light diffusing surface 323 directly reaches the abutment surface 324. Here, the "light directly reaching the abutment surface 324 from the light diffusing surface 323" denotes light, such as light beams $L_s$, $L_c$, and $L_L$ in FIG. 6, that reaches the abutment surface 324 without being reflected by other surfaces of the light guide 32. Therefore, light, such as a light beam I, that reaches the abutment surface 324 after being reflected by another surface of the light guide 32 is excluded. The light reaching the abutment surface 324 is reflected by the abutment surface 324, reaches the light emission surface 322, and is emitted to the outside (the reading line O of the illuminated object P).

A position C in FIG. 6 (position C is not actually a point, but is a line extending in the longitudinal direction) indicates a position where the incident angle of the light directly reaching the abutment surface 324 from the light diffusing surface 323 is a critical angle α. The critical angle α is a minimum angle at which the light reaching the abutment surface 324 from the light diffusing surface 323 is totally reflected by the abutment surface 324. The position C will be referred to as a "critical position C" for the convenience of the description. The light beam $L_c$ illustrated in FIG. 6 is an example of a light beam (light beam entering the critical position C) in which the incident angle to the abutment surface 324 is the critical angle α. The light beam $L_s$ is an example of a light beam in which the incident angle to the abutment surface 324 is smaller than the critical angle α. The light beam $L_L$ is an example of a light beam in which the incident angle to the abutment surface 324 is larger than the critical angle α. When the incident angle to the abutment surface 324 is equal to or larger than the critical angle α as in the light beams $L_c$ and $L_L$, the light reaching the abutment surface 324 is totally reflected by the abutment surface 324. Therefore, the light is not emitted to the outside from the abutment surface 324. On the other hand, when the incident angle to the abutment surface 324 is smaller than the critical angle α as in the light beam $L_s$, part of the light reaching the abutment surface 324 is emitted to the outside without being reflected by the abutment surface 324.

As shown in FIG. 6, the incident angle to the abutment surface 324 of the light directly reaching the abutment surface 324 from the light diffusing surface 323 increases toward the upper side. According to the configuration, the incident angle of the light directly reaching the abutment surface 324 from the light diffusing surface 323 is equal to or larger than the critical angle α at the critical position C and above the critical position C and is smaller than the critical angle α below the critical position C. Therefore, the light directly reaching the abutment surface 324 from the light diffusing surface 323 is not emitted to the outside from the abutment surface 324 at the critical position C and above the critical position C. As a result, leak light caused by the light directly reaching the abutment surface 324 from the light diffusing surface 323 is not generated in this part. On the other hand, part of the light directly reaching the abutment surface 324 from the light diffusing surface 323 is emitted to the outside in the part below the critical position C. In this way, the possibility of the leak light caused by the light directly reaching the abutment surface 324 from the light diffusing surface 323 increases toward the lower side in the abutment surface 324.

The height of the bottom surface 238 of the adhesive filling portion 237 of the partition wall 235 is locally lower than the upper ends (upper surfaces) of the other parts of the partition wall 235. Therefore, local leak light is easily generated, or the amount of leak light tends to be locally large in the adhesive filling portion 237. When there is leak light (or when the amount of leak light is large) at the position corresponding to the adhesive filling portion 237, the output of the image sensor 221 becomes nonuniform. When the illuminated object P is displaced in the vertical direction on the upper surface of the frame cover 24, the output of the image sensor 221 may change according to the position of the illuminated object P in the Z-axis direction. In this case, the tendency of the output of the image sensor 221 easily varies (i.e. similarity is easily broken) depending on the position of the illuminated object P in the Z direction. The correction is difficult when the tendency of the output of the image sensor 221 varies.

(Configuration for Suppressing Leak Light)

A configuration for suppressing the leak light in the present embodiment will be described. When the light guide 32 is incorporated into the frame 23 in the present embodiment, the light diffusing surface 323 is positioned on the lower side, and the abutment surface 324 is positioned on one side in the sub-scan direction. The light guide 32 has a shape satisfying the following two conditions (1) and (2) when incorporated into the frame 23. (1) The incident angle to the abutment surface 324 of the light directly reaching the abutment surface 324 from the light diffusing surface 323 increases toward the upper side. (2) The incident angle of the light directly reaching the abutment surface 324 from the light diffusing surface 323 is the critical angle $\alpha$ at an intermediate part of the abutment surface 324 in the vertical direction. A specific configuration for satisfying these two conditions (1) and (2) is as follows.

As for (1), the light diffusing surface 323 needs to be provided at the bottom of the abutment surface 324 or below the abutment surface 324 as viewed in the sub-scan direction. Particularly, when the abutment surface 324 is inclined in the sub-scan direction as shown in FIG. 6, a position F of the upper end of the light diffusing surface 323 needs to be positioned below a position T of the upper end of the abutment surface 324. According to the configuration, the incident angle of the light directly reaching the abutment surface 324 from the light diffusing surface 323 increases toward the upper side.

As for (2), the cross-sectional shape of the light guide 32 needs to satisfy the following formula.

$$\tan\alpha < (L_B/L_A)$$

In the formula, $\alpha$ denotes the critical angle which is the minimum incident angle for the total reflection. $L_A$ is a distance from the abutment surface 324 to a position F of the light diffusing surface in the normal line direction. The normal line here is a normal line of the abutment surface 324. The position F of the light diffusing surface 323 is a position with the minimum incident angle of the light directly reaching the abutment surface 324. $L_B$ is a distance between the position F of the light diffusing surface 323 and the upper end T of the abutment surface 324 as viewed in the normal line direction (distance in the direction of the abutment surface 324). When the positional relationship between the light diffusing surface 323 and the abutment surface 324 satisfies the formula, the critical position C is in the intermediate part in the vertical direction (at least below the position T of the upper end of the abutment surface 324). The critical position C is also changed by the refractive index of the light guide 32. The refractive index of the light guide 32 depends on the material of the light guide 32 and the emission wavelength of the light emitting elements included in the light source 31. Therefore, the cross-sectional shape of the light guide 32 is formed to satisfy the formula according to the material of the light guide 32 and the configuration of the light source 31.

The light diffusing surface 323 has a certain width as shown in FIG. 6, and the incident angle of the light directly reaching the abutment surface 324 from a position N closest to the abutment surface (right edge in FIG. 6) is different from the incident angle of the light reaching the abutment surface 324 from the position F farthest from the abutment surface 324 (left edge in FIG. 6). In the configuration example illustrated in FIG. 6, the incident angle of the light from the position F farthest from the abutment surface 324 is the smallest, and the incident angle of the light from the position N closest to the abutment surface 324 is the largest. Therefore, the position where the incident angle of the light directly reaching the abutment surface 324 from the position on the light diffusing surface 323 with the smallest incident angle relative to the abutment surface 324 (here, position farthest from the abutment surface 324) is the critical angle $\alpha$ is the critical position C in the present embodiment. The critical position C is positioned in the intermediate part in the vertical direction. According to the configuration, the incident angle of the light directly reaching the critical position C and above the critical position C from the light diffusing surface 323 is all equal to or larger than the critical angle $\alpha$.

Figure 7A:
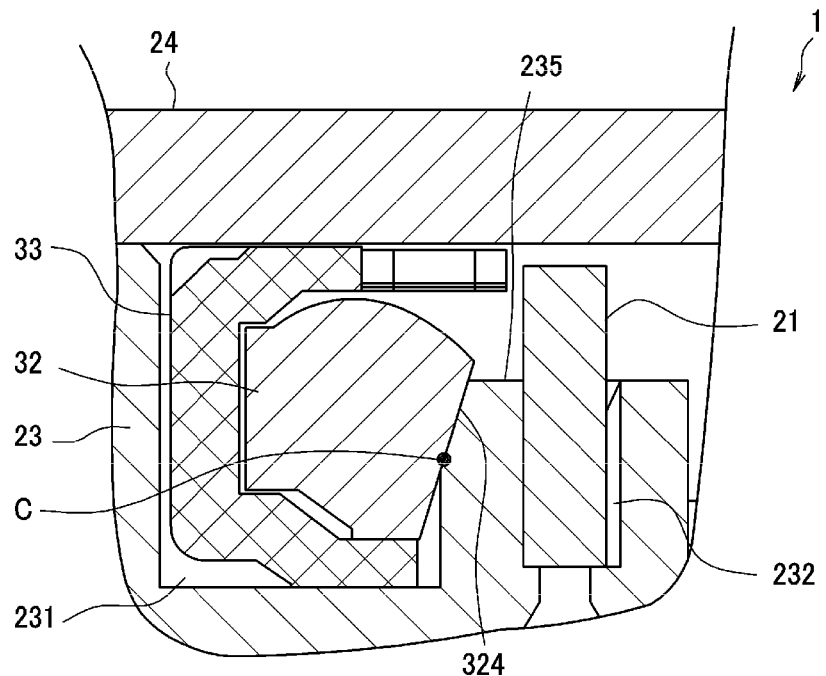
FIG. 7A is a sectional view schematically illustrating a configuration near the light guide 32, a light condenser 21, and a partition wall 235 and is a view taken along a plane perpendicular to the main-scan direction.
Figure 7B:
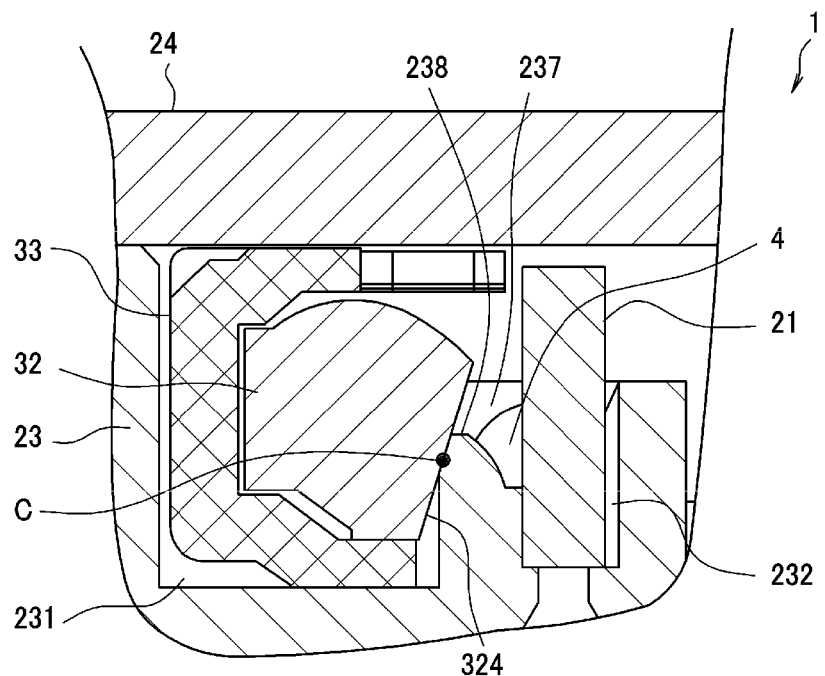
FIG. 7B is a sectional view schematically illustrating the configuration near the light guide 32, the light condenser 21, and the partition wall 235 and is a view taken along the plane perpendicular to the main-scan direction.

FIGS. 7A and 7B are sectional views schematically illustrating a configuration in the vicinity of the light guide 32, the light condenser 21, and the partition wall 235, taken along a plane perpendicular to the main-scan direction. FIG. 7A illustrates a cross section taken along at a position that is not the adhesive filling portion 237, and FIG. 7B illustrates a cross section taken along at the adhesive filling portion 237. As shown in FIG. 7A, the critical position C is positioned in the intermediate part of the abutment surface 324 in the vertical direction (at least below the position T at the upper edge) in the light guide 32. The partition wall 235 has a rib-shaped (or plate-shaped) configuration protruding upward from between the light guide 32 and the light condenser 21 to extend in the main-scan direction, and the upper end (upper surface) is positioned above the critical position C of the abutment surface 324 of the light guide 32. As shown in FIG. 7B, the bottom surface 238 (upper surface) of the adhesive filling portion 237 is also provided above the critical position C of the abutment surface 324 of the light guide 32. In this way, at least the part of the abutment surface 324 below the critical position C is covered by the partition wall 235, including the position corresponding to the adhesive filling portion 237. The position of the critical position C can be calculated by assuming or confirming the cross-sectional dimension and the shape of the light guide 32 as well as the refractive index of the light guide. Therefore, the position of the upper end of the partition wall 235 in the vertical direction and the position of the bottom surface 238 of the adhesive filling portion 237 in the vertical direction can be determined based on the calculated position.

As shown in FIG. 7B, it is preferable that the bottom surface 238 of the adhesive filling portion 237 is an inclined surface in which the side of the light guide housing chamber 231 is high, and the side of the light condenser housing chamber 232 is low. According to the configuration, the partition wall 235 can easily cover up to the part above the critical position C of the abutment surface 324 of the light guide 32. The area of contact between the light condenser 21 and the adhesive 4 poured into the adhesive filling portion 237 can be increased, and the outflow of the adhesive 4 from the adhesive filling portion 237 can be suppressed. In the bottom surface 238 of the adhesive filling portion 237, it is only necessary that the end closer to the light guide housing chamber 231 (end on the side covering the light diffusing surface 323 of the light guide 32) is positioned above (higher than) the critical position C. Therefore, the end closer to the light condenser housing chamber 232 of the bottom surface 238 of the adhesive filling portion 237 can be positioned below the critical position C. The bottom surface 238 of the adhesive filling portion 237 may be a flat surface or a curved surface.

As described, the position of the upper end (upper surface) of the partition wall 235 is positioned at the critical position C of the abutment surface 324 of the light guide 32 or above the critical position C in the present embodiment. The position of the bottom surface 238 (upper surface) of the adhesive filling portion 237 is also positioned at the critical position C of the abutment surface 324 of the light guide 32 or above the critical position C. In other words, at least the part below the critical position C (part where the incident angle of the directly reaching light from the light diffusing surface 323 is smaller than the critical angle α) is covered by the partition wall 235, including the part corresponding to the adhesive filling portion 237. According to the configuration, there is no leak light caused by the light directly reaching the abutment surface 324 from the light diffusing surface 323. Particularly, the local leak light or the local increase in the amount of leak light can be suppressed at the part corresponding to the adhesive filling portion 237. Therefore, the distribution of the amount of light reaching the reading line O of the illuminated object P in the main-scan direction can be uniform. This can suppress the reduction in the uniformity of the output of the image sensor 221. Particularly, a local increase in the illuminance at the part corresponding to the adhesive filling portion 237 can be prevented.

According to the present embodiment, the breakdown of the similarity in the output of the image sensor 221 can be suppressed or prevented even if the illuminated object P is displaced in the vertical direction. More specifically, the output of the image sensor 221 may be changed by the position of the illuminated object P in the vertical direction. In this case, even if the position of the illuminated object P is changed, the brightness can be corrected according to the position of the illuminated object P to obtain an image with suppressed uneven brightness if the tendency of the output of the image sensor 221 is the same (i.e. output is similar). However, if the tendency of the output of the image sensor 221 is changed (similarity is broken down) by the position of the illuminated object P in the vertical direction, it is difficult to obtain an image without uneven brightness based on general brightness correction. If there is local leak light from the part corresponding to the adhesive filling portion 237, the tendency of the output of the image sensor 221 is easily changed depending on the position of the illuminated object P in the vertical direction. On the other hand, the present embodiment can suppress the local leak light from the adhesive filling portion 237, and the tendency in the output of the image sensor 221 does not change even if the position of the illuminated object P in the vertical direction is changed. In this way, according to the present embodiment, the leak light at the adhesive filling portion 237 can be suppressed, the output of the image sensor 221 can be uniform, and the similarity in the output can be improved.

(Paper Sheet Distinguishing Apparatus)

Figure 8:
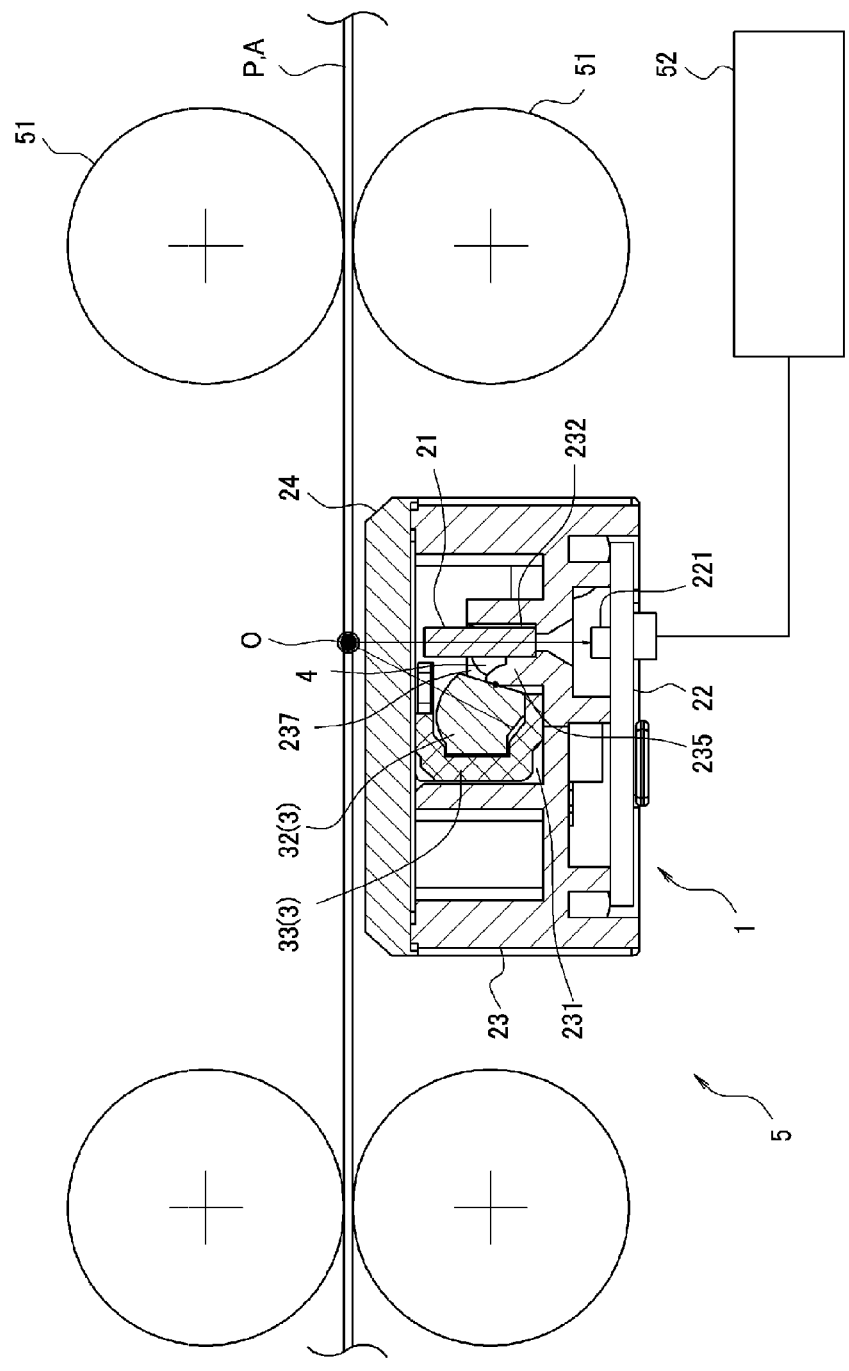
FIG. 8 is a sectional view schematically illustrating a configuration of a paper distinguishing apparatus 5 and is a view illustrating a cross section of a plane perpendicular to the main-scan direction.

A paper sheet distinguishing apparatus 5 to which the image sensor unit 1 is applied will be described with reference to FIG. 8. FIG. 8 is a sectional view schematically illustrating a configuration of the paper sheet distinguishing apparatus 5 and is a view illustrating a cross section of a plane perpendicular to the main-scan direction. The paper sheet distinguishing apparatus 5 emits light to a bill or the like that is the illuminated object P, reads light from the bill, and uses the read light to distinguish the type or the authenticity of the bill. The light source 31 of the image sensor unit 1 applied to the paper sheet distinguishing apparatus 5 includes a light emitting element that emits visible light and a light emitting element that emits infrared light.

As shown in FIG. 8, the paper sheet distinguishing apparatus 5 includes: the image sensor unit 1; conveyor rollers 51 for conveying the bill; and an image distinguishing portion 52 as distinguishing means wired and connected to a connector 222. The paper sheet distinguishing apparatus 5 is provided with a conveyance path A for holding the bill between the conveyor rollers 51 to convey the bill in the reading direction (sub-scan direction) over the image sensor unit 1 through the cover member 11. The focus on the upper side (closer to the bill) of the light condenser 21 is set at the center of the conveyance path A in the vertical direction.

The operation of the paper sheet distinguishing apparatus 5 with the configuration is as follows. Based on the operation described above, the image sensor unit 1 applied to the paper sheet distinguishing apparatus 5 reads a visible light image of a predetermined pattern provided on the bill and reads an infrared image of the bill. The image distinguishing portion 52 then determines the authenticity of the bill by comparing a genuine bill image, which is obtained by emitting visible light and infrared light to a prepared genuine bill, with the visible light image and the infrared image of the bill to be determined in the authenticity determination. This is because the genuine bill includes an area in which the images obtained under visible light and under infrared light are different. The parts not described and not illustrated can be the same configuration as in a conventional paper sheet distinguishing apparatus. The image distinguishing portion 52 may be provided on the circuit board 22.

Figure 9:
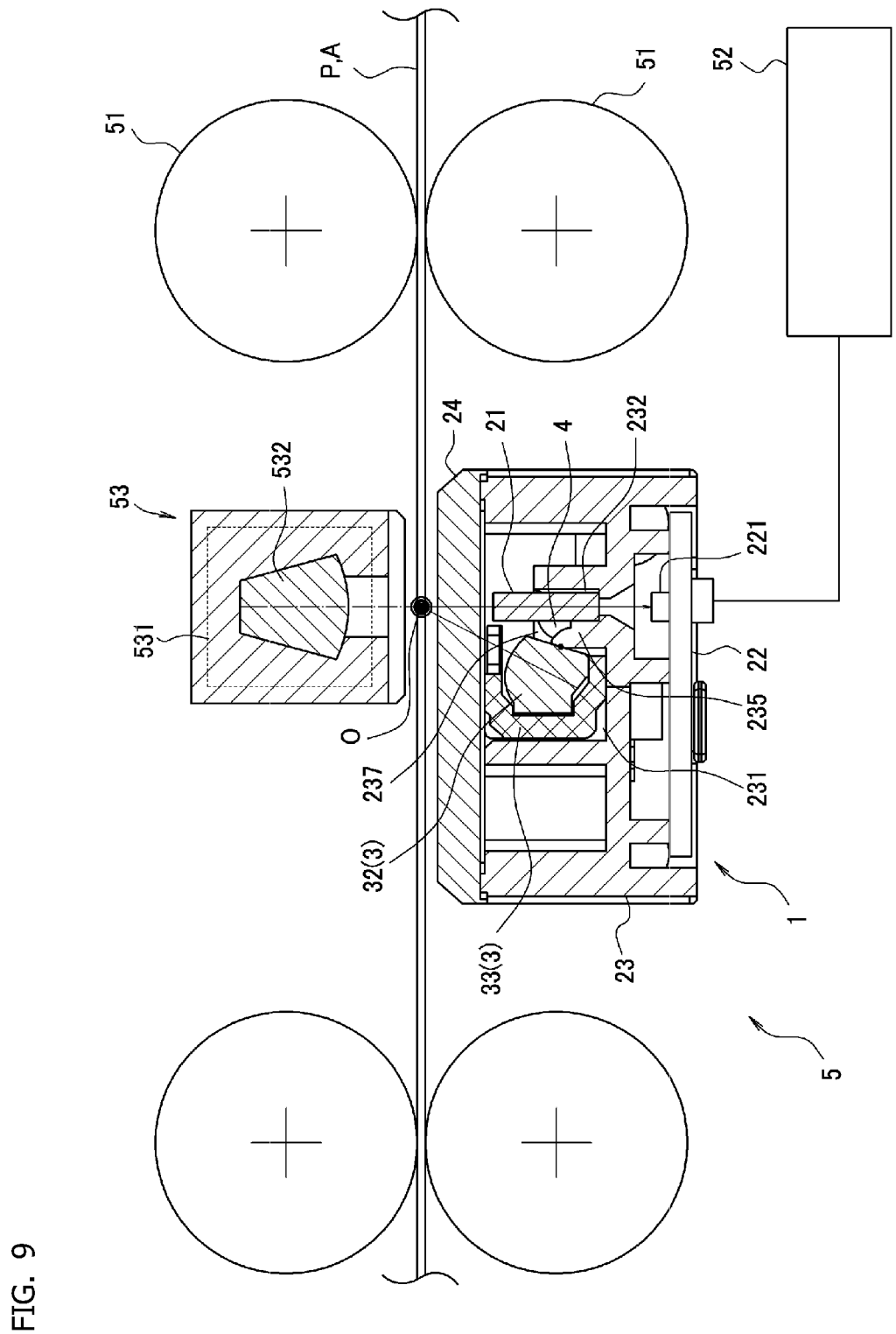
FIG. 9 is a sectional view schematically illustrating a configuration of the paper sheet distinguishing apparatus 5 further including a transmission illumination apparatus 53.

FIG. 9 is a sectional view schematically illustrating a configuration of the paper sheet distinguishing apparatus 5 further including a transmission illumination apparatus 53. The transmission illumination apparatus 53 includes a light source 531 and a light guide 532. The same configurations as the light source 31 and the light guide 32 of the illumination apparatus 3 are applied to the light source 531 and the light guide 532 of the transmission illumination apparatus 53. The transmission illumination apparatus 53 is provided at a position facing the image sensor unit 1 so as to be able to emit light to the bill. Particularly, the transmission illumination apparatus 53 is arranged so that the light axis of the light emitted from the emission surface of the light guide 532 coincides with the light axis of the light condenser 21 of the image sensor unit 1.

The operation of the paper sheet distinguishing apparatus 5 with the configuration is as follows. The light source 31 incorporated into the image sensor unit 1 and the light source 531 of the transmission illumination apparatus 53 sequentially turn on the light emitting elements of the visible light of each color and the infrared light. The light emitted to the bill from the light guide 32 of the illumination apparatus 3 of the image sensor unit is reflected by the surface of the bill to enter the light condenser 21, and an image is formed on the surface of the image sensor 221. The image sensor 221 converts the formed optical image into an electric signal to acquire a visible light image and an infrared image based on the reflected light from the bill. Meanwhile, the light emitted to the bill from the transmission illumination apparatus 53 transmits through the bill to enter the light condenser 21 of the image sensor unit 1, and an image is formed on the surface of the image sensor 221. The image sensor 221 converts the formed optical image into an electric signal to acquire a visible light image and an infrared image based on the transmitted light from the bill.

The illumination apparatus 3 and the transmission illumination apparatus 53 of the image sensor unit 1 alternately repeat, in a short time, the operation of emitting light to the bill and detecting the reflected light and the transmitted light. Based on the operation, the image sensor unit 1 reads a visible light image of a predetermined pattern (for example, a hologram) provided on the bill and reads an infrared image of the bill. According to the configuration, the paper sheet distinguishing apparatus 5 can read the visible light image and the infrared image based on the reflected light and the transmitted light of the bill.

Figure 10:
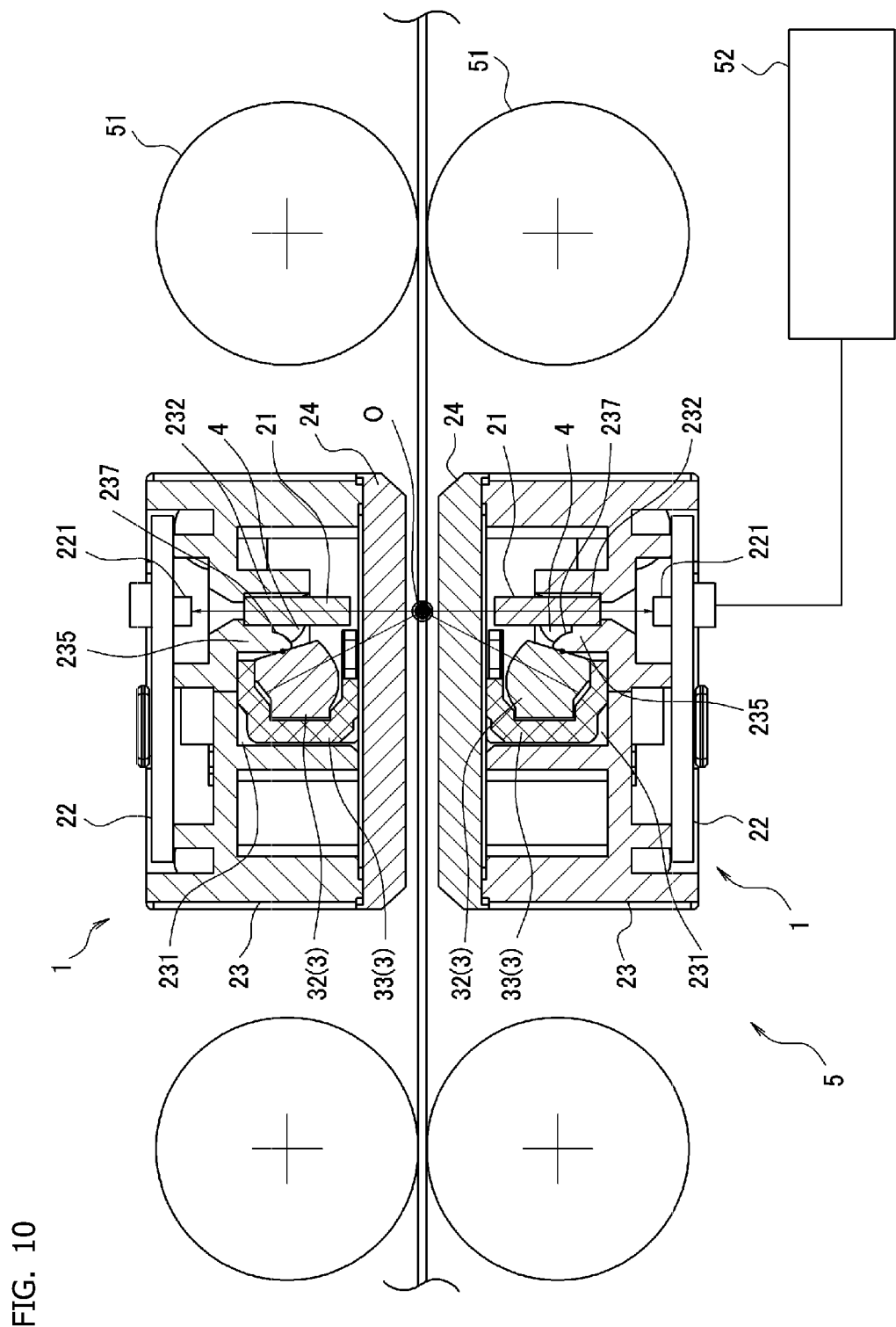
FIG. 10 is a sectional view schematically illustrating a configuration of the paper sheet distinguishing apparatus 5 including two sets of image sensor units 1.

Furthermore, the paper sheet distinguishing apparatus 5 may include two sets of image sensor units 1. FIG. 10 is a sectional view schematically illustrating a configuration of the paper sheet distinguishing apparatus 5 including two sets of image sensor units 1. As shown in FIG. 10, the two sets of image sensor units 1 are arranged to face each other across the conveyance path A of the bill. The two sets of image sensor units 1 are arranged so that the light emitted from the light guide 32 of one of the image sensor units 1 and transmitted through the bill enters the light condenser 21 of the other image sensor unit 1.

The operation of the paper sheet distinguishing apparatus 5 with the configuration is as follows. The light sources 31 of the illumination apparatuses incorporated into the two sets of image sensor units 1 sequentially turn on the light emitting elements of the visible light of each color and the infrared light. The light emitted from the illumination apparatus 3 of one of the image sensor units 1 to the bill is reflected by the surface of the bill and enters the light condenser 21 of one of the image sensor units 1, and an image is formed on the surface of the image sensor 221 of one of the image sensor units 1. The image sensor 221 of one of the image sensor units 1 converts the formed optical image into an electric signal to acquire a visible light image and an infrared image based on the reflected light from the bill. The light emitted from the illumination apparatus 3 of one of the image sensor units 1 to the bill transmits through the bill and enters the light condenser 21 of the other image sensor unit 1, and an image is formed on the surface of the image sensor 221 of the other image sensor unit 1. The image sensor 221 of the other image sensor unit 1 converts the formed optical image into an electric signal to acquire a visible light image and an infrared image based on the transmitted light from the bill. According to the configuration, the paper sheet distinguishing apparatus 5 can read reflected images of both surfaces of the bill and can read transmitted images.

Although the visible light beam and the infrared light are emitted to read the visible light image and the infrared image of the bill in the present embodiment, the configuration is not limited to this. For example, ultraviolet light may be emitted. Although the bill is applied as the illuminated object P, the type of the paper sheet is not limited. For example, various securities and ID cards can be applied.

(Image Reading Apparatus (Part 1))

Figure 11:
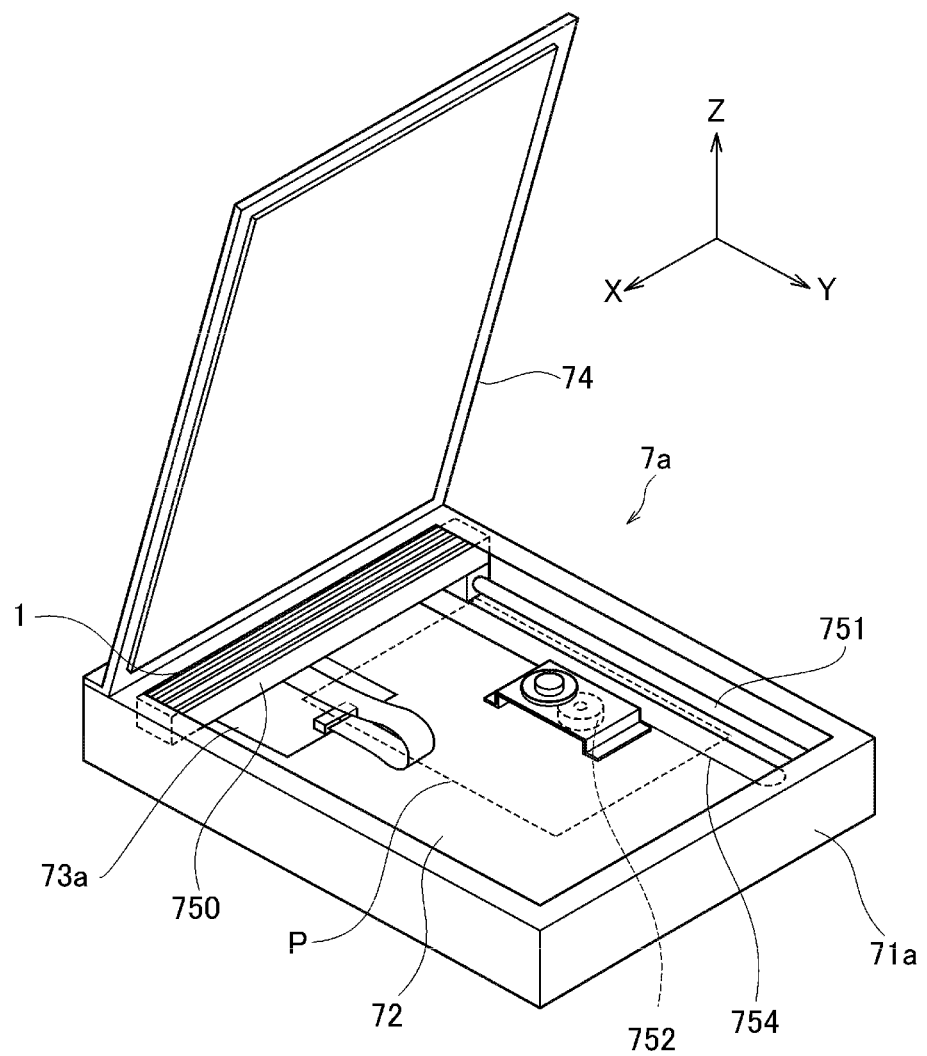

FIG. 11 is a perspective view illustrating a configuration of a flat-bed type scanner 7a as an image reading apparatus to which the image sensor unit 1 as an embodiment of the present invention can be applied. The scanner 7a includes: a housing 71a; a platen glass 72 as an illuminated object placement portion; the image sensor unit 1; a driving mechanism that drives the image sensor unit 1; a circuit board 73a; and a platen cover 74. The platen glass 72 as an illuminated object placement portion is made of a transparent plate, such as glass, and is attached to the upper surface of the housing 71a. The platen cover 74 is attached to the housing 71a through a hinge mechanism or the like so as to cover the illuminated object P placed on the platen glass 72, and the platen cover 74 can be freely opened and closed. The image sensor unit 1, the driving mechanism for driving the image sensor unit 1, and the circuit board 73a are housed in the housing 71a.

The driving mechanism includes a holding member 750, a guide shaft 751, a driving motor 752, and a wire 754. The holding member 750 surrounds and holds the image sensor unit 1. The guide shaft 751 guides the holding member 750, allowing the holding member 750 to move in the reading direction (sub-scan direction) along the platen glass 72. The driving motor 752 and the holding member 750 are coupled through a wire 754, and the driving force of the driving motor 752 moves the holding member 750 that holds the image sensor unit 1 in the sub-scan direction. The image sensor unit 1 reads the illuminated object P, such as an original, placed on the platen glass 72, while the driving force of the driving motor 752 moves the image sensor unit 1 in the sub-scan direction. In this way, the illuminated object P is read while moving the image sensor unit 1 relative to the illuminated object P.

An image processing circuit that applies predetermined image processing to the image read by the image sensor unit 1, a control circuit that controls the components of the scanner 7a including the image sensor unit 1, a power supply circuit that supplies power to the components of the scanner 7a, and the like are built on the circuit board 73a.

(Image Reading Apparatus (Part 2))

Figure 12:
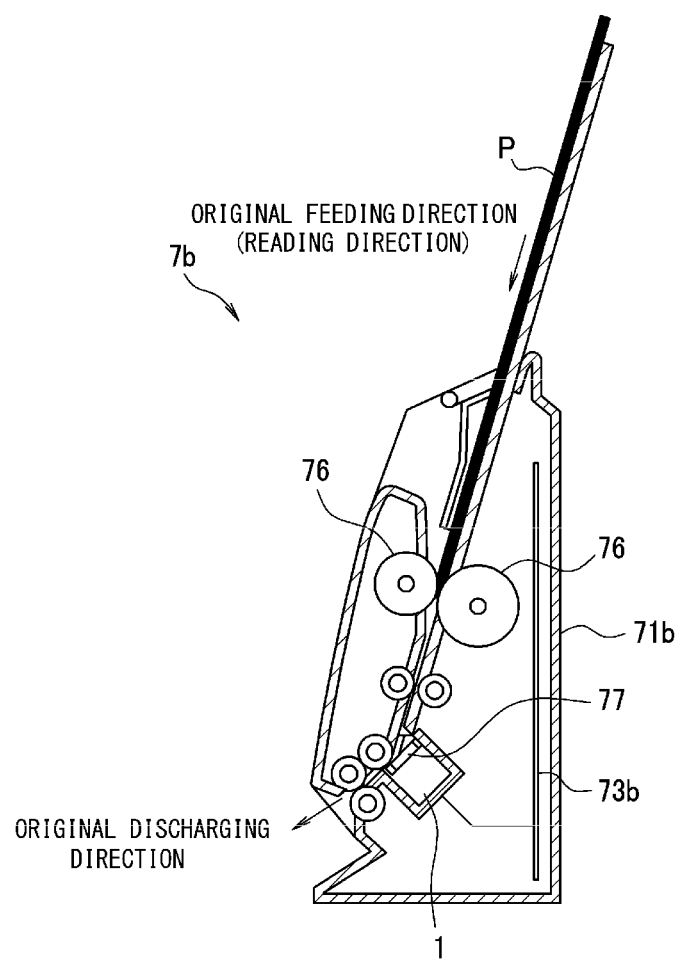
FIG. 12 is a sectional schematic view illustrating a configuration of a sheet-feed type scanner 7b.

FIG. 12 is a sectional schematic view illustrating a configuration of a sheet-feed type scanner 7b as an image reading apparatus to which the image sensor unit 1 as an embodiment of the present invention can be applied. As shown in FIG. 12, the scanner 7b includes a housing 71b, the image sensor unit 1, conveyor rollers 76, a circuit board 73b, and a cover glass 77. A driving mechanism not shown rotates the conveyor rollers 76 to convey the illuminated object P between the conveyor rollers 76. The cover glass 77 is provided to cover the upper side of the image sensor unit 1. A control circuit that controls the components of the scanner 7b including the image sensor unit 1, a power supply circuit that supplies power to the components of the scanner 7b, and the like are built on the circuit board 73b.

In the scanner 7b, the image sensor unit 1 reads the illuminated object P, while the conveyor rollers convey the illuminated object P in the reading direction (sub-scan direction). Therefore, the illuminated object P is read while relatively moving the image sensor unit 1 and the illuminated object P. Although FIG. 9 illustrates an example of the scanner 7b that reads one side of the illuminated object P, two image sensor units 1 may be provided to face each other across the conveyance path A of the illuminated object, and both sides of the illuminated object P may be read.

Although the scanners 7a and 7b are described with reference to FIGS. 11 and 12 as examples of the image reading apparatus using the image sensor unit 1 to which the present invention can be applied, the configuration and the type of the image reading apparatus using the image sensor unit 1 are not limited to these.

(Image Forming Apparatus)

Figure 13:
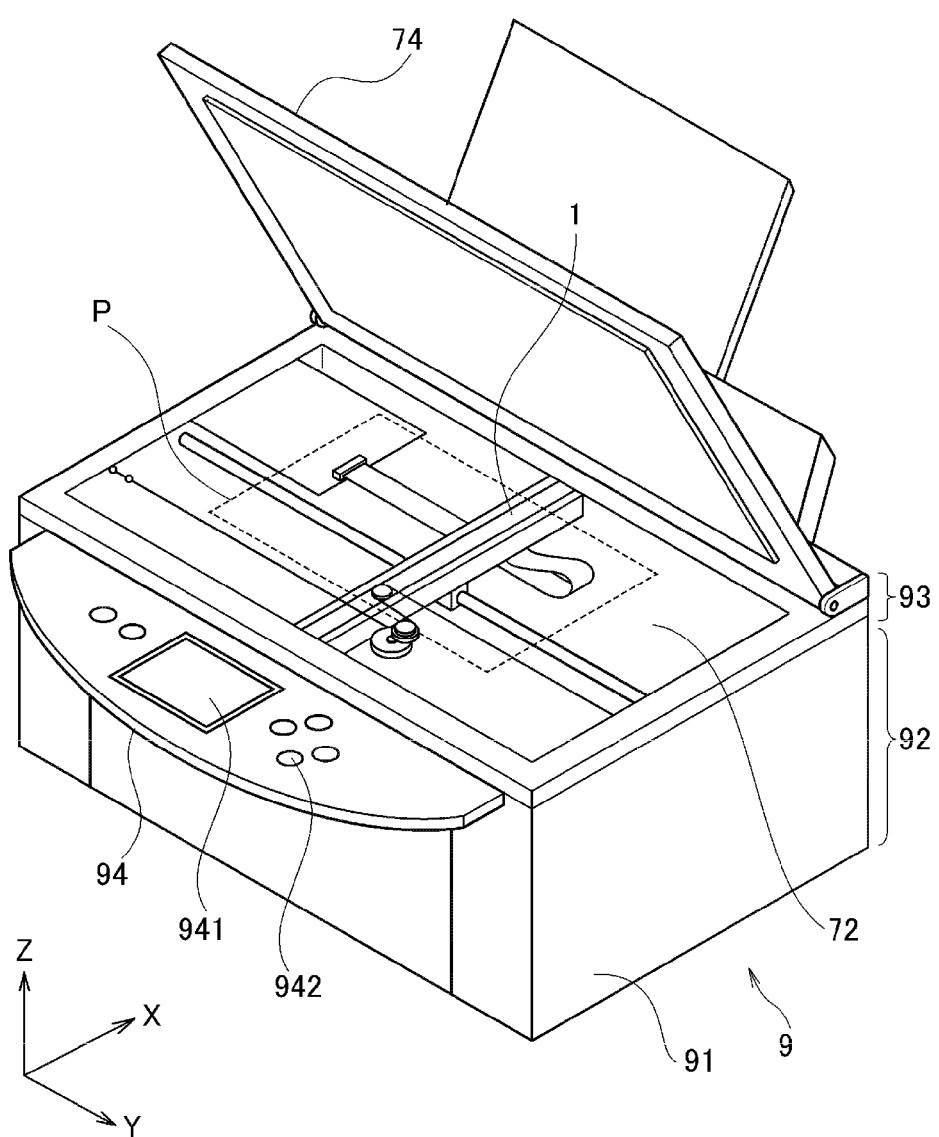
FIG. 13 is an external perspective view of an image forming apparatus 9 as an embodiment of the present invention.
Figure 14:
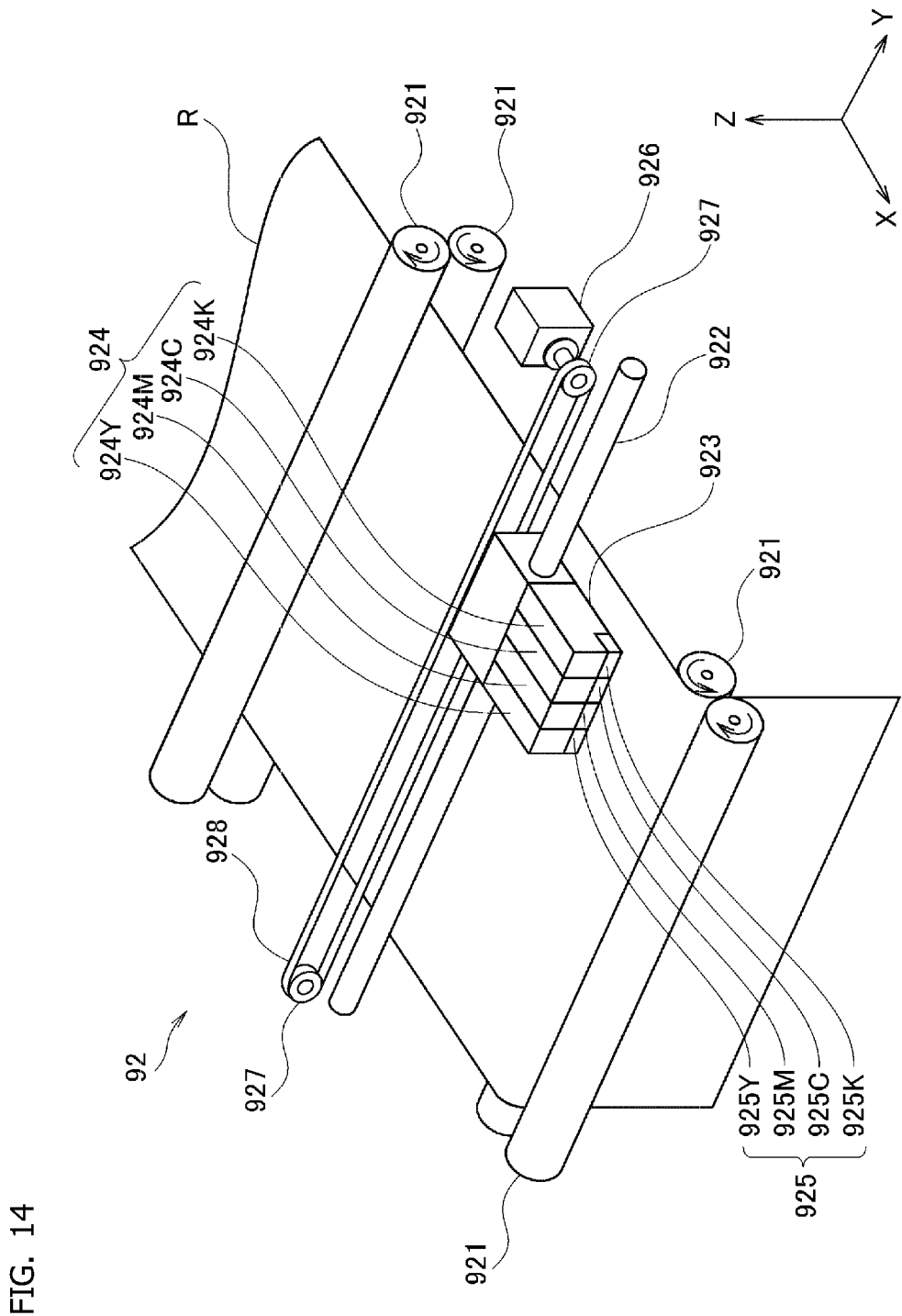
FIG. 14 is a perspective view illustrated by extracting an image forming portion 92 provided inside of a housing 91 of the image forming apparatus 9 as an embodiment of the present invention.

The image forming apparatus 9 as an embodiment of the present invention will be described with reference to FIGS. 13 and 14. The image sensor unit 1 as an embodiment of the present invention is applied to the image forming apparatus 9 as an embodiment of the present invention. FIG. 13 is an external perspective view of the image forming apparatus 9 as an embodiment of the present invention. FIG. 14 is a perspective view illustrated by extracting an image forming portion 92 provided in a housing 91 of the image forming apparatus 9 as an embodiment of the present invention. As shown in FIGS. 13 and 14, the image forming apparatus 9 is a multifunction printer (MFP) of a flat-bed type scanner and an inkjet-type printer. The image forming apparatus 9 includes: an image reading portion 93 as image reading means for reading an image; and an image forming portion 92 as image forming means for forming an image. The image sensor unit 1 is incorporated into the image reading portion of the image forming apparatus 9. The configuration common to the image reading apparatus can be applied to the image reading portion 93 of the image forming apparatus 9. Therefore, the configuration common to the image reading apparatus will not be described.

As shown in FIG. 13, the image forming apparatus includes an operation portion 94. The operation portion 94 includes: a display portion 941 that displays an operation menu, various messages, and the like; and various operation buttons 942 for operating the image forming apparatus 9. As shown in FIG. 14, the image forming portion 92 is provided inside of a housing 91 of the image forming apparatus 9. The image forming portion 92 includes conveyor rollers 921, a guide shaft 922, an inkjet cartridge 923, a motor 926, and a pair of timing pulleys 927. The conveyor rollers 921 are rotated by driving force of a driving source to convey printing paper R as a recording medium in the sub-scan direction. The guide shaft 922 is a rod-shaped member and is fixed to the housing 91 of the image forming apparatus 9 so that the axis line is parallel to the main-scan direction of the printing paper R.

The inkjet cartridge 923 can slide over the guide shaft 922 to move back and forth in the main-scan direction of the printing paper R. The inkjet cartridge 923 includes, for example: ink tanks 924 with cyan C, magenta M, yellow Y, and black K inks (924C, 924M, 924Y, and 924M); and discharge heads 925 (925C, 925M, 925Y, and 925K) provided on the ink tanks 924, respectively. One of the pair of timing pulleys 927 is attached to the rotating shaft of the motor 926. The pair of timing pulleys 927 are arranged at positions away from each other in the main-scan direction of the printing paper R. A timing belt 928 is wound around the pair of timing pulleys 927 in parallel with the pair of timing pulleys 927, and a predetermined section is coupled to the inkjet cartridge 923.

The image reading portion 93 of the image forming apparatus 9 converts the image read by the image sensor unit 1 into an electric signal in a form suitable for printing. Based on the electric signal converted by the image sensor unit 1 of the image reading portion 93, the image forming portion 92 of the image forming apparatus 9 drives the conveyor rollers 921, the motor 926, and the inkjet cartridge 923 to form the image on the printing paper R. The image forming portion 92 of the image forming apparatus 9 can also form an image based on an electric signal input from the outside. The configuration and operation of the image forming portion 92 of the image forming apparatus 9 can be the same configurations as various conventionally well-known printers. Therefore, the details will not be described. Although an inkjet-type image forming apparatus has been described as the image forming portion 92, the type can be any type, such as an electrophotographic type, a thermal transfer type, and a dot impact type.

EXAMPLE

Figure 15A:
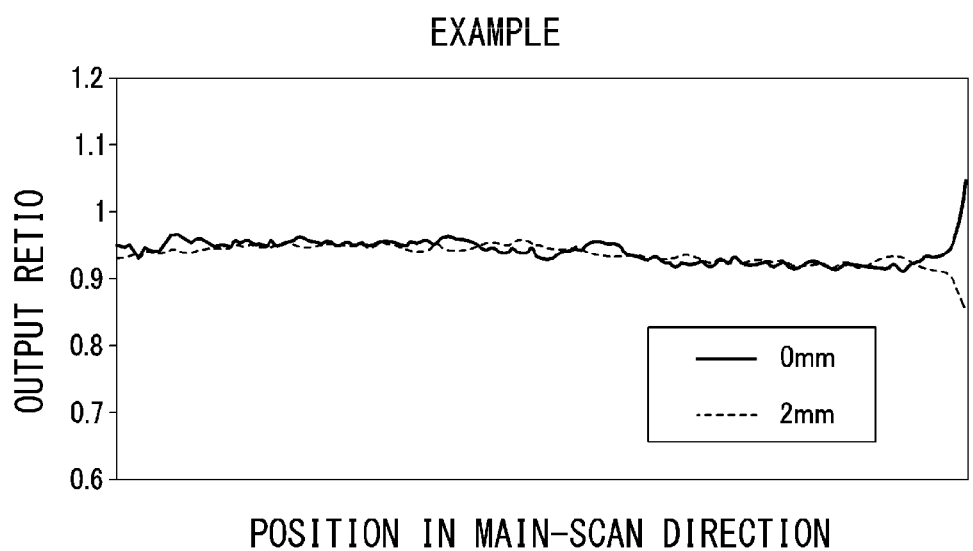
FIG. 15A is a graph illustrating an example of measurement results of output of the image sensor of the image sensor unit according to an example of the present invention.
Figure 15B:
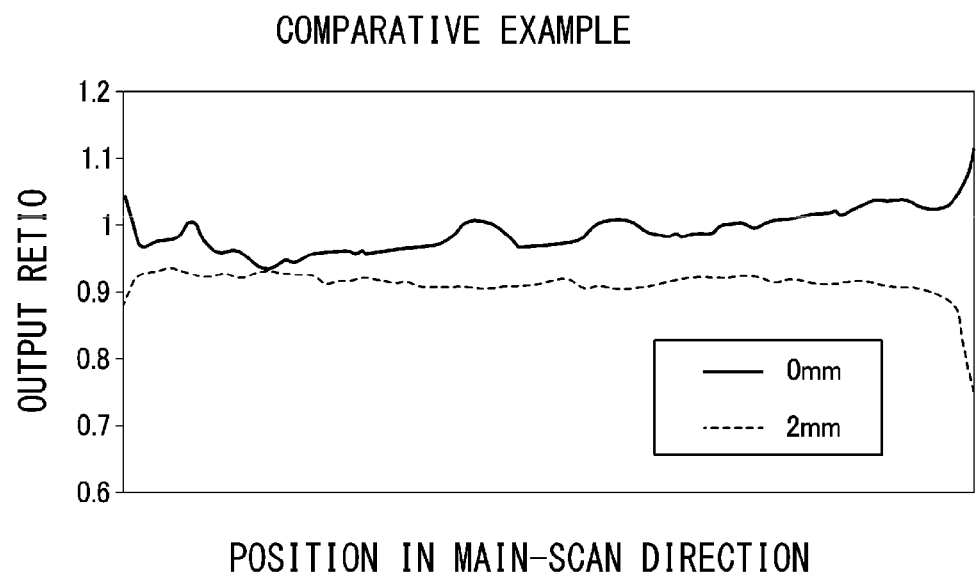
FIG. 15B is a graph illustrating an example of measurement results of output of an image sensor of an image sensor unit according to a comparative example.

An example of the present invention will be described. The position of the illuminated object P in the vertical direction is changed to measure the output of the image sensor in each of the image sensor units of the example of the present invention and a comparative example. In the image sensor unit of the example of the present invention, the part below the critical position C in the abutment surface of the light guide is covered by the partition wall including the adhesive filling portion. On the other hand, in the image sensor unit of the comparative example, the part corresponding to the adhesive filling portion of the part below the critical position is exposed without being covered by the partition wall. FIG. 15A is a graph illustrating an example of measurement results of the output of the image sensor of the image sensor unit according to the example of the present invention. FIG. 15B is a graph illustrating an example of measurement results of the output of the image sensor of the image sensor unit according to the comparative example. In the graphs of FIGS. 15A and 15B, the horizontal axis denotes the position in the main-scan direction, and the vertical axis denotes the output ratio of the image sensor unit. The output ratio is a value obtained by dividing an output, which is an output of the image sensor when the illuminated object P is arranged at each position with the height 0 mm and 2 mm from the surface of the cover frame, by an output, which is an output when the illuminated object P is arranged at a position with the height 1 mm from the surface of the cover frame.

As shown in FIG. 15B, the results of the comparative example indicate that the output ratio of the part corresponding to the adhesive filling portion is high when the illuminated object P is arranged at the position of 0 mm. The results also indicate that the tendency of the output ratio varies between the output ratio in which the illuminated object P is at the position of 2 mm and the output ratio at the position of 0 mm. On the other hand, as shown in FIG. 15A, the output ratio of the part corresponding to the adhesive filling portion is not high, and a uniform output ratio as a whole is obtained in the example, even when the illuminated object P is arranged at the position of 0 mm. The output ratios with the illuminated object P at the positions of 0 mm and 2 mm indicate the same tendency. In this way, it is confirmed that according to the example of the present invention, the leak light from the part corresponding to the adhesive filling portion can be suppressed, and the output of the image sensor can be uniform. It is also confirmed that the tendency of the output ratio is the same (similarity is not broken down) even when the illuminated object P is moved in the vertical direction.

Although the embodiments and the example of the present invention have been described in detail, the embodiments and the example are just specific examples for carrying out the present invention. The technical scope of the present invention is not limited to the embodiments and the example. Various changes can be made in the present invention without departing from the scope of the present invention.

The present invention can be effectively used for an image sensor unit and for a paper sheet distinguishing apparatus, an image reading apparatus, and an image forming apparatus (for example, an image scanner, a facsimile, a copying machine, or a multifunction printer) to which the image sensor unit is applied. According to the present invention, the leak light from the light guide can be suppressed, the output can be uniform, and the similarity of the output can be improved.

According to the present invention, the leak light from the light guide can be suppressed. Therefore, the output can be uniform, and the similarity of the output can be improved.

What is claimed is:

1. An image sensor unit comprising: a light source; a rod-shaped light guide that shapes light emitted by the light source into a line to illuminate an illuminated object; a light condenser that condenses light from the illuminated object; and a frame that houses the light guide and the light condenser, the frame comprising: a light guide housing chamber that houses the light guide; a light condenser housing chamber that houses the light condenser; a partition wall provided between the light guide housing chamber and the light condenser housing chamber, the light guide comprising: a light incident surface that receives the light emitted by the light source; a light diffusing surface that diffuses light entered from the light incident surface; a light emission surface that emits light toward the illuminated object; and an abutment surface abutted to one side of the partition wall, wherein a part of the abutment surface of the light guide, where an incident angle to the abutment surface of light directly reaching the abutment surface from the light diffusing surface is smaller than a critical angle, is covered by the partition wall, and the light condenser and the partition wall are bonded by an adhesive.

2. The image sensor unit according to claim 1, wherein in the light guide, a critical position where the incident angle of the light directly reaching the abutment surface from the light diffusing surface is the critical angle is positioned in an intermediate part of the abutment surface in a height direction, the incident angle of the light directly reaching the abutment surface from the light diffusing surface is equal to or larger than the critical angle at the critical position and above the critical position, the incident angle of the light directly reaching the abutment surface from the light diffusing surface is smaller than the critical angle below the critical position, and an upper end of the partition wall is positioned above the critical position.

3. The image sensor unit according to claim 2, wherein notches for filling the adhesive for bonding the light condenser to the frame are formed on the upper end of the partition wall, and bottom surfaces of the notches are positioned above the critical position.

4. The image sensor unit according to claim 1, wherein the light condenser is abutted to the partition wall in a sub-scan direction.

5. The image sensor unit according to claim 3, wherein the light guide and the light condenser are arranged in parallel, the partition wall protrudes upward and extends parallel to a longitudinal direction of the light guide and the light condenser, and the notches are provided at a plurality of parts of the partition wall.

6. The image sensor unit according to claim 3, wherein the bottom surfaces of the notches are inclined surfaces, in which a side closer to the light guide is positioned above the critical position, and a side closer to the light condenser is lower than the side closer to the light guide.

7. A paper sheet distinguishing apparatus that reads light from a paper sheet while relatively moving an image sensor unit and the paper sheet, the image sensor unit comprising: a light source; a rod-shaped light guide that shapes light emitted by the light source into a line to illuminate an illuminated object; a light condenser that condenses light from the illuminated object; and a frame that houses the light guide and the light condenser, the frame comprising: a light guide housing chamber that houses the light guide; a light condenser housing chamber that houses the light condenser; a partition wall provided between the light guide housing chamber and the light condenser housing chamber, the light guide comprising: a light incident surface that receives the light emitted by the light source; a light diffusing surface that diffuses light entered from the light incident surface; a light emission surface that emits light toward the illuminated object; and an abutment surface abutted to one side of the partition wall, wherein a part of the abutment surface of the light guide, where an incident angle to the abutment surface of light directly reaching the abutment surface from the light diffusing surface is smaller than a critical angle, is covered by the partition wall, and the light condenser and the partition wall are bonded by an adhesive.

8. An image reading apparatus that reads reflected light from an illuminated object while relatively moving an image sensor unit and the illuminated object, the image sensor unit comprising: a light source; a rod-shaped light guide that shapes light emitted by the light source into a line to illuminate the illuminated object; a light condenser that condenses light from the illuminated object; and a frame that houses the light guide and the light condenser, the frame comprising: a light guide housing chamber that houses the light guide; a light condenser housing chamber that houses the light condenser; a partition wall provided between the light guide housing chamber and the light condenser housing chamber, the light guide comprising: a light incident surface that receives the light emitted by the light source; a light diffusing surface that diffuses light entered from the light incident surface; a light emission surface that emits light toward the illuminated object; and an abutment surface abutted to one side of the partition wall, wherein a part of the abutment surface of the light guide, where an incident angle to the abutment surface of light directly reaching the abutment surface from the light diffusing surface is smaller than a critical angle, is covered by the partition wall, and the light condenser and the partition wall are bonded by an adhesive.

9. An image forming apparatus comprising:

image reading means for reading reflected light from an illuminated object while relatively moving an image sensor unit and the illuminated object; and image forming means for forming an image in a recording medium, the image sensor unit comprising: a light source; a rod-shaped light guide that shapes light emitted by the light source into a line to illuminate the illuminated object; a light condenser that condenses light from the illuminated object; and a frame that houses the light guide and the light condenser, the frame comprising: a light guide housing chamber that houses the light guide; a light condenser housing chamber that houses the light condenser; a partition wall provided between the light guide housing chamber and the light condenser housing chamber, the light guide comprising: a light incident surface that receives the light emitted by the light source; a light diffusing surface that diffuses light entered from the light incident surface; a light emission surface that emits light toward the illuminated object; and an abutment surface abutted to one side of the partition wall, wherein a part of the abutment surface of the light guide, where an incident angle to the abutment surface of light directly reaching the abutment surface from the light diffusing surface is smaller than a critical angle, is covered by the partition wall, and the light condenser and the partition wall are bonded by an adhesive.

* * * * *